(12) United States Patent
Miyake et al.

(10) Patent No.: US 9,977,290 B2
(45) Date of Patent: May 22, 2018

(54) METHOD FOR MANUFACTURING LIQUID CRYSTAL DISPLAY DEVICE

(71) Applicant: Sharp Kabushiki Kaisha, Osaka-shi, Osaka (JP)

(72) Inventors: Isamu Miyake, Osaka (JP); Koichi Miyachi, Osaka (JP); Hiroaki Asagi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 247 days.

(21) Appl. No.: 14/907,870

(22) PCT Filed: Jul. 24, 2014

(86) PCT No.: PCT/JP2014/069518
§ 371 (c)(1),
(2) Date: Jan. 27, 2016

(87) PCT Pub. No.: WO2015/016121
PCT Pub. Date: Feb. 5, 2015

(65) Prior Publication Data
US 2016/0178968 A1    Jun. 23, 2016

(30) Foreign Application Priority Data
Jul. 30, 2013    (JP) ................. 2013-158117

(51) Int. Cl.
*G02F 1/1337*    (2006.01)
*C09D 179/08*    (2006.01)

(52) U.S. Cl.
CPC ..... *G02F 1/133788* (2013.01); *C09D 179/08* (2013.01); *G02F 1/133711* (2013.01)

(58) Field of Classification Search
CPC .......... G02F 1/133788; G02F 1/13378; G02F 1/1337; G02F 1/133711; C09D 179/08
See application file for complete search history.

(56) References Cited

U.S. PATENT DOCUMENTS

| 2007/0102668 A1 | 5/2007 | Oh et al. |
| 2015/0275089 A1 | 10/2015 | Katano et al. |

FOREIGN PATENT DOCUMENTS

| CN | 101300323 A | 11/2008 |
| JP | 08-179328 A | 7/1996 |
| JP | 4459417 B2 | 4/2010 |
| JP | 2011-085901 A | 4/2011 |
| WO | 2012/093682 A1 | 7/2012 |
| WO | 2014/069550 A1 | 5/2014 |

OTHER PUBLICATIONS

English machine translation of JP 2011-85901A.*
Official Communication issued in International Patent Application No. PCT/JP2014/069518, dated Aug. 26, 2014.
Sakamoto et al., "In-Plane Molecular Order of a Photo-oriented Polyamic Acid Film: Enhancement upon Thermal Imidization", Molecular Crystals and Liquid Crystals, vol. 412, 2004, pp. 293-299.
Kawatsuki et al., "Photocontrol of Thermally Induced Reorientation of Amorphous Composite Film with Photo-Crosslinkable Polymer Liquid Crystal and Non-Liquid Crystalline Rodlike Monomer", Japanese Journal of Applied Physics, vol. 41 Part 2, No. 2B, Feb. 15, 2002, pp. L198-L200.
Kawatsuki et al., "Control of Thermally Enhanced Photoinduced Reorientation Direction of Photocrosslinkable Copolymer Liquid Crystals and Application to Polarization Gratings Using Linearly Polarized Ultraviolet Light", Japanese Journal of Applied Physics, vol. 43, No. 8A, 2004, pp. 5447-5450.
Kawatsuki et al., "Molecular-Oriented Photoalignment Layer for Liquid Crystals", Japanese Journal of Applied Physics, vol. 46, No. 1, 2007, pp. 339-341.
Dozono et al., "Synthesis and photoresponsive behavior of hydrogen-bonded photoreactive liquid-crystalline polymers containing amide groups based on post polymer reaction", Polymer Preprints, vol. 60, No. 2, 2011, p. 3878.

\* cited by examiner

*Primary Examiner* — Anne Hines
(74) *Attorney, Agent, or Firm* — Keating & Bennett, LLP

(57) ABSTRACT

The present invention provides a method for manufacturing a liquid crystal display device including a photo-alignment film and capable of sufficiently improving the display quality. The method for manufacturing a liquid crystal display device of the present invention is a method for manufacturing a liquid crystal display device including a photo-alignment film. The method for manufacturing a liquid crystal display device successively includes a step (1) of forming on a substrate a film from a photo-alignment-film material that contains a solvent, a polymer including a photo-functional group that is capable of causing at least one chemical reaction selected from the group consisting of photodimerization, photoisomerization, and photo-Fries rearrangement, and a polymer including a polyamic acid backbone and free from the photo-functional group; a step (2) of pre-heating the film to evaporate the solvent; a step (3) of irradiating the pre-heated film with polarized light; and a step (4) of main-heating the polarized-light-irradiated film. The liquid crystal display device is of an in-plane switching mode or a fringe field switching mode in each of which a pre-tilt angle is substantially 0°.

19 Claims, No Drawings

METHOD FOR MANUFACTURING LIQUID CRYSTAL DISPLAY DEVICE

TECHNICAL FIELD

The present invention relates to a method for manufacturing a liquid crystal display device. The present invention specifically relates to a method for manufacturing a liquid crystal display device in relation to the conditions for forming an alignment film.

BACKGROUND ART

Thin-profile display devices such as liquid crystal display devices have rapidly spread in recent years, and are widely used for not only televisions but also electronic books, digital photo frames, industrial appliance (IA), personal computers (PCs), tablet PCs, smartphones, and the like. These applications demand a wide variety of performance, and various liquid crystal display modes are developed.

Frequently used liquid crystal display modes include an in-plane switching (IPS) mode and a fringe field switching (FFS) mode in which the liquid crystal molecules having positive or negative anisotropy of dielectric constant are aligned in the direction horizontal to the main surface of a substrate.

Liquid crystal display devices require uniform alignment of the liquid crystal molecules. Examples of alignment treatment of alignment films for aligning the liquid crystal molecules include rubbing and photo-alignment, and rubbing in which the surface of an alignment film is rubbed with a cloth has widely been applied. However, the rubbing causes problems such as foreign-matter defects due to dust of cloth and display unevenness, and breaking of thin film transistor elements due to static electricity generated in rubbing with a cloth. Further, as the definition of the display devices such as tablet PCs and smartphones more and more increases, it becomes more and more difficult to uniformly align the liquid crystal molecules by rubbing, in which the alignment precision is restricted by the density of the pile of a cloth. Thus, in order to solve these problems, photo-alignment has been recently developed in which anisotropy is given to an alignment film by applying light such as UV to generate an anchoring force, instead of the rubbing.

Some documents are known to disclose a method of uniformly aligning the liquid crystal molecules by the aforementioned alignment treatment and thereby preventing display failure (for example, see Patent Literature documents 1 and 2). Some other documents are known to disclose a composition for photo-alignment films containing a photoreactive compound which increases the degree of freedom of material selection (for example, see Patent Literature 3). Some other documents are known to disclose that main heating during formation of an alignment film improves the orientational order of a polymer (for example, see Non-Patent Literature documents 1 and 5). Still other documents are known to disclose that performing pre-heating, polarized UV irradiation, and main heating in the order set forth improves the orientational order of a polymer (for example, see Non-Patent Literature documents 2 to 4). Non-Patent Literature 4 relates to formation of a photo-alignment film.

CITATION LIST

Patent Literature

Patent Literature 1: JP H08-179328 A
Patent Literature 2: JP 4459417 B
Patent Literature 3: WO 2012/093682

Non-Patent Literature

Non-Patent Literature 1: K. Sakamoto, et al., "In-plane Molecular Order of a Photo-oriented Polyamic Acid Film: Enhancement upon Thermal Imidization", Molecular Crystals and Liquid Crystals, 2004, Vol. 412, p. 293-299

Non-Patent Literature 2: N. Kawatsuki, et al., "Photocontrol of Thermally Induced Reorientation of Amorphous Composite Film with Photo-Crosslinkable Polymer Liquid Crystal and Non-Liquid Crystalline Rodlike Monomer", Jpn. J. Appl. Phys., Vol. 41 (2002), pp. L198-L200

Non-Patent Literature 3: N. Kawatsuki, et al., "Control of Thermally Enhanced Photoinduced Reorientation Direction of Photocrosslinkable Copolymer Liquid Crystals and Application to Polarization Gratings Using Linearly Polarized Ultraviolet Light", Jpn. J. Appl. Phys., Vol. 43, No. 8A, 2004, pp. 5447-5450

Non-Patent Literature 4: N. Kawatsuki, et al., "Molecular-Oriented Photoalignment Layer for Liquid Crystals", Jpn. J. Appl. Phys., Vol. 46, No. 1, 2007, pp. 339-341

Non-Patent Literature 5: Y. Dozono, et al., "Synthesis and photoresponsive behavior of hydrogen-bonded photoreactive liquid-crystalline polymers containing amide groups based on post polymer reaction", Polymer Preprints, Japan, Vol. 60, No. 2, 2011, pp. 3878 (1Pf066)

SUMMARY OF INVENTION

Technical Problem

As mentioned above, alignment treatment by a photo-alignment method on an alignment film (hereinafter also referred to as a photo-alignment film) has been examined. However, such a photo-alignment method may sometimes cause problems such as (1) a drop in the voltage holding ratio of a liquid crystal display device when used for a long time, deteriorating the display quality; (2) an insufficient anchoring force, resulting in insufficient contrast or deteriorating the image sticking characteristics; and (3) poor exposure sensitivity of a photo-alignment film, which causes a requirement of a high energy (dose) light irradiation (e.g., UV irradiation), generating degradation products of a photo-alignment film and deteriorating the display quality. No means for solving all of these problems has been found, and thus a mass-producible photo-alignment method for IPS- or FFS-mode liquid crystal display devices has never been developed.

The present inventors have performed various studies on the causes of these problems. Then, they have found that the problem (1) significantly occurs especially during long-term use under current flow at high temperature.

The present inventors have also found that the problem (2) is caused by an insufficient orientational order of the polymer contained in a photo-alignment film and the resulting uneven alignment of the liquid crystal molecules even after photo-alignment treatment. Here, the orientational order indicates, for example, the degree of anisotropy of a polymer after photo-alignment treatment for alignment in a predetermined direction. The degree of anisotropy can be determined by refractive index anisotropy or absorption factor anisotropy, for example.

The present inventors have also found that the problem (3) especially occurs in a photo-degradable photo-alignment film.

Patent Literature 1 discloses a method of producing a liquid crystal alignment film and a method of producing a liquid crystal element which can achieve uniform alignment without unevenness owing to a high pre-tilt angle in aligning a chiral smectic liquid crystal using an alignment film and prevent display failure of liquid crystal. In the invention of Patent Literature 1, however, the chiral smectic liquid crystal is aligned by rubbing. Thus, further improvement for solving the problems is required. Further, the invention of Patent Literature 1 aims to achieve a high pre-tilt angle. Still, in IPS- or FFS-mode liquid crystal display devices, which are the targets of the present invention, such a high pre-tilt angle deteriorates the viewing angle characteristics, for example, resulting in poor display quality.

Patent Literature 2 discloses a method of liquid crystal alignment treatment which can achieve a liquid crystal pre-tilt angle required for a liquid crystal alignment element without oblique irradiation, and a liquid crystal display element. However, Patent Literature 2 fails to disclose IPS- or FFS-mode liquid crystal display devices, which are the targets of the present invention. Thus, further improvement for solving the problems is required. Further, the invention of Patent Literature 2 aims to achieve a pre-tilt angle by vertical irradiation. Still, in IPS- or FFS-mode liquid crystal display devices, which are the targets of the present invention, such a pre-tilt angle deteriorates the viewing angle characteristics, for example, resulting in poor display quality.

Patent Literature 3 discloses a composition for photo-alignment films containing a photo-reactive compound with a high degree of freedom of material selection. However, Patent Literature 3 fails to specifically disclose the process of burning an alignment film. Thus, further improvement for solving the problems is required in order to optimize the main heating conditions and to further improve the orientational order and electrical characteristics of the polymer.

Non-Patent Literature 1 discloses that the orientational order of a polyimide alignment film containing azobenzene in its main chain is determined and that the orientational order after the main heating is higher than the orientational order before the main heating. However, Non-Patent Literature 1 discloses only one main heating condition, i.e., 250° C. for one hour. Thus, further improvement for solving the problems is required in order to optimize the main heating conditions. Further, Non-Patent Literature 1 fails to disclose pre-heating. Without pre-heating, an uneven film thickness occurs in a photo-alignment film, deteriorating the display quality. In addition, Non-Patent Literature 1 fails to disclose a photo-alignment-film material containing two or more polymers, so that the electrical characteristics may be poor and alignment defects such as alignment stains or alignment unevenness may occur. Thus, further improvement for solving the problems in these respects is required.

Non-Patent Literature documents 2 to 4 disclose that successively performing pre-heating, polarized UV irradiation, and main heating is effective to improve the orientational order of the polymer. Still, Non-Patent Literature documents 2 to 4 fail to disclose a photo-alignment-film material containing two or more polymers, so that the electrical characteristics may be poor and alignment defects such as alignment stains or alignment unevenness may occur. Thus, further improvement for solving the problems in these respects is required. Further, Non-Patent Literature documents 2 and 3 fail to disclose formation of an alignment film.

Non-Patent Literature 5 discloses that in an acrylic polymer including a liquid crystal structure, highly ordered alignment is generated by the liquid crystallinity (self-assembly) and hydrogen bond due to an amide group, and further discloses that heat treatment within the range of a liquid crystal temperature is effective. However, Non-Patent Literature 5 discloses only one main heating condition, i.e., a single treatment at a specific temperature and fails to disclose pre-heating. Without pre-heating, an uneven film thickness occurs in a photo-alignment film, deteriorating the display quality. In addition, Non-Patent Literature 5 fails to disclose a photo-alignment-film material containing two or more polymers, so that the electrical characteristics may be poor and alignment defects such as alignment stains or alignment unevenness may occur. Thus, further improvement for solving the problems in these respects is required.

The present invention is devised in consideration of the above situation, and aims to provide a method for manufacturing a liquid crystal display device including a photo-alignment film and capable of sufficiently improving the display quality.

Solution to Problem

The present inventors have performed various studies on the causes of significant occurrence of the problem (1) during long-term use under current flow at high temperature. Then, they have found that impurities contained in the components such as the photo-alignment film and a sealing material are eluted into the liquid crystal and behave as mobile ions, causing a drop in the voltage holding ratio during long-term use under current flow at high temperature.

Thus, the present inventors have performed various studies on a method for manufacturing a liquid crystal display device capable of solving the problem (1), including a photo-alignment film, and sufficiently improving the display quality. Then, they have focused on the use of photo-alignment-film material containing a polymer including a polyamic acid backbone. The present inventors have further found that formation of a photo-alignment film using a photo-alignment-film material containing a polymer including a polyamic acid backbone presumably allows an —NH group and a —COOH group to exist on the surface of the photo-alignment film and that such groups are presumably capable of adsorbing the aforementioned impurities (mobile ions), so that a drop in the voltage holding ratio can be sufficiently prevented, sufficiently improving the display quality.

With respect to the problem (2), the present inventors have also performed various studies on the causes of insufficient improvement in the orientational order of the polymer. Then, they have found that light irradiation after the progress of the thermochemical reaction of the polymer by main heating fails to sufficiently improve the orientational order of the polymer. This is presumably because light irradiation alone may fail to completely align the polymer. The present inventors have also found that, even if light irradiation is performed before the main heating, too low a main heating temperature causes insufficient improvement in the orientational order of the polymer. Since light irradiation fails to completely align the polymer, the polymer immediately after the light irradiation include molecules deviated from a predetermined alignment direction and the orientational order of the polymer is not sufficiently improved. Thus, presumably, too low a main heating temperature may fail to activate the polymer whose orientational order is not sufficiently improved immediately after the light irradiation, so that the aforementioned polymer deviated from a predetermined alignment direction is difficult to realign in a predetermined alignment direction.

Thus, the present inventors have performed various studies on a method for manufacturing a liquid crystal display device capable of solving the problem (2), including a photo-alignment film, and sufficiently improving the display quality. Then, they have focused on performing light irradiation before main heating and performing the main heating at temperature where the molecular motion of the polymer by the heating is activated. As a result, they have found that performing light irradiation before main heating and performing the main heating at temperature where the molecular motion of the polymer by the heating is activated easily causes the molecular motion of the polymer by heating owing to the anisotropy formed by the light irradiation, so that the polymer is realigned (hereinafter, also referred to as self-assembled) in a predetermined alignment direction and the orientational order of the polymer is sufficiently improved. They have further found that a certain amount of solvent is advantageously left before the main heating in order to proceed the self-assembly, and the orientational order of the polymer by the self-assembly can sufficiently be improved by lowering the pre-heating temperature to the degree that does not affect the quality of the photo-alignment film or the display quality. Thereby, the present inventors have found that the display quality can sufficiently be improved.

The present inventors have performed various studies on the causes of the problem (3) markedly occurring on photo-degradable photo-alignment films. Then, they have found that light irradiation causes generation of low-molecular-weight degradation products, and the degradation products are eluted and aggregated in the liquid crystal during long-term use of a liquid crystal display device, thereby deteriorating the display quality (e.g., causing bright spot defects).

Thus, the present inventors have performed various studies on a method for manufacturing a liquid crystal display device capable of solving the problem (3), including a photo-alignment film, and sufficiently improving the display quality. Then they have focused on the use of a photo-alignment film which utilizes at least one chemical reaction selected from the group consisting of photodimerization, photoisomerization, and photo-Fries rearrangement as a main mechanism of forming alignment anisotropy. As a result, they have found that use of a photo-alignment-film material containing a polymer including a photo-functional group capable of causing at least one chemical reaction selected from the group consisting of photodimerization, photoisomerization, and photo-Fries rearrangement prevents generation of low-molecular-weight degradation products due to the light irradiation, sufficiently improving the display quality.

As mentioned above, the present inventors have arrived at the solution of the aforementioned problems, and completed the present invention.

Specifically, one aspect of the present invention may be a method for manufacturing a liquid crystal display device including a photo-alignment film, the method for manufacturing a liquid crystal display device successively including: a step (1) of forming on a substrate a film from a photo-alignment-film material that contains a solvent, a polymer including a photo-functional group that is capable of causing at least one chemical reaction selected from the group consisting of photodimerization, photoisomerization, and photo-Fries rearrangement, and a polymer including a polyamic acid backbone and free from the photo-functional group; a step (2) of pre-heating the film to evaporate the solvent; a step (3) of irradiating the pre-heated film with polarized light; and a step (4) of main-heating the polarized-light-irradiated film, the liquid crystal display device being of an in-plane switching mode or a fringe field switching mode in each of which a pre-tilt angle is substantially 0°.

The method for manufacturing a liquid crystal display device according to one aspect of the present invention is not especially limited and may include other steps.

Advantageous Effects of Invention

One aspect of the present invention can provide a method for manufacturing a liquid crystal display device including a photo-alignment film and capable of sufficiently improving the display quality.

DESCRIPTION OF EMBODIMENTS

The photo-alignment-film material contains a solvent, a polymer including a photo-functional group that is capable of causing at least one chemical reaction selected from the group consisting of photodimerization, photoisomerization, and photo-Fries rearrangement, and a polymer including a polyamic acid backbone and free from the photo-functional group, and it provides a photo-alignment film through the steps (1) to (4). In other words, the photo-alignment film is a film that exerts an anchoring force on the liquid crystal molecules as a result of at least one chemical reaction selected from the group consisting of photodimerization, photoisomerization, and photo-Fries rearrangement of the photo-functional group by light irradiation. The photo-alignment-film material may contain a polymer that is different from the above two polymers.

The above two polymers may be any combination of a polymer including a photo-functional group that is capable of causing at least one chemical reaction selected from the group consisting of photodimerization, photoisomerization, and photo-Fries rearrangement and a polymer including a polyamic acid backbone and free from the photo-functional group. They are preferably those sufficiently having characteristics required for an alignment film after appropriate main heating. Further, since the photo-alignment-film material contains a polyamic acid, the ease of application of the material to a substrate in forming the film can be improved in terms of the solubility to the solvent and the affinity with the substrate. Further, in terms of electrical characteristics, the polyamic acid can reduce image sticking due to residual direct current (DC) in combination with the dielectric constant and specific resistance of the liquid crystal layer. Thus, it is effective to thermochemically react (thermally imidize) part of the polyamic acid in advance.

The solvent may be any liquid (at room temperature) that can dissolve or disperse the two polymers therein, and is to be removed from the photo-alignment-film material through the steps (2) and (4). The solvent may contain not only a component (good solvent) suitable for dissolving the two polymers therein but also a component (poor solvent) that is suitable for spreading the photo-alignment-film material in a uniform thickness on a substrate, and the solvent is preferably a mixture thereof.

The step (1) (hereinafter, also referred to as the step of forming a film from a photo-alignment-film material) may be application by an inkjet process or spin coating, or flexography printing (transcription), for example. The photo-alignment-film material has only to be applied on a substrate to form a film such that this film can serve as a photo-alignment film as a result of the following steps. The film-forming conditions may appropriately be selected in accordance with the method of forming the film, for example. The thickness and other properties of the film may also be the same as the thickness and other properties of a usual photo-alignment film. The substrate to be covered with the film may be any substrate to which a treatment for forming a photo-alignment film can be applied, and may be a substrate after various treatments.

In the step (2) (hereinafter, also referred to as the pre-heating step) the film is heated and dried so that the solvent is evaporated, for example. The pre-heating step may partially remove the solvent or substantially completely remove the solvent. The pre-heating step may be performed using a heater, such as a hot plate or a baking furnace, set to a predetermined temperature, for example.

In the step (3) (hereinafter, also referred to as the light irradiation step), the pre-heated film is photo-alignment-treated by ultraviolet rays, visible light, or both of them. Polarized ultraviolet rays are preferred. The light irradiation conditions in the light irradiation step can be usual conditions for forming a photo-alignment film.

In the step (4) (hereinafter, also referred to as the main heating step), the self-assembly is allowed to proceed, the thermochemical reaction of the polymer is allowed to proceed, and the residual solvent is evaporated, for example. The main heating step may be performed using a heater, such as a hot plate or a baking furnace, set to a predetermined temperature, for example.

The liquid crystal display device is of an in-plane switching (IPS) mode or a fringe field switching (FFS) mode in each of which the pre-tilt angle is substantially 0°. The photo-alignment film constituting such a liquid crystal display device may be a film (hereinafter, also referred to as a horizontal photo-alignment film) which aligns the liquid crystal molecules in the direction horizontal to the main surface of a substrate. The horizontal photo-alignment film has only to align at least adjacent liquid crystal molecules to be substantially horizontal to the surface of the horizontal photo-alignment film. The phrase "the pre-tilt angle is substantially 0°" herein means, for example, that the pre-tilt angle of the liquid crystal molecules is not greater than 1° with respect to the surface of the horizontal photo-alignment film.

The present invention will be mentioned in more detail in the following examples, but is not limited to these examples. The following examples may be employed in appropriate combination or varied as long as the combination or variation is not beyond the spirit of the present invention.

Example 1

In Example 1, a photo-alignment-film material containing two polymers was used. The following describes a method for manufacturing a liquid crystal display device according to Example 1.
(Structure of Liquid Crystal Display Device)
A liquid crystal display device has an FFS-mode electrode structure, and the pre-tilt angle is 0°.
(Photo-Alignment-Film Material)
A mixture of two polymers at a weight ratio of 50:50 was used as a solid matter. One of the two polymers is a polymer including a methacrylic backbone and a photo-reactive cinnamate group in a side chain, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of N-methyl-pyrrolidone and butyl cellosolve at a weight ratio of 50:50. The solid concentration was 4% by weight. The cinnamate group is a photodimerizable and photoisomerizable photo-functional group.
(Step of Forming Film from Photo-Alignment-Film Material)
A film was formed on each of two substrates from the photo-alignment-film material by spin-coating.
(Pre-Heating Step)
The films on the two substrates after the step of forming a film from a photo-alignment-film material were pre-heated at 70° C. for 150 seconds. The pre-heating was performed using a hot plate (trade name: EC-1200N, As One Corp.). The pre-heated films formed from the photo-alignment-film material had a thickness of about 100 nm.
(Light Irradiation Step)
The pre-heated films on the two substrates were irradiated with polarized ultraviolet rays. The dose of the polarized ultraviolet rays was 5 mJ/cm$^2$ within a wavelength range of 280 to 330 nm.
(Main Heating Step)
The light-irradiated films on the two substrates were main-heated at 140° C. for 10 minutes. The main heating was performed using a hot plate (trade name: EC-1200N, As One Corp.).

Thereafter, the two substrates after the main heating step were assembled with each other with a sealing material in between such that the polarization directions of the polarized ultraviolet rays applied were parallel with each other. The assembly of the two substrates was then subjected to a step of heat-curing the seal and other steps, and thereby an FFS-mode liquid crystal display device was obtained. The liquid crystal material for forming a liquid crystal layer was dropped onto one of the two substrates in advance. Still, the liquid crystal material may be fed into the assembly of the substrates. The liquid crystal material used was one containing liquid crystal molecules having positive anisotropy of dielectric constant, and the thickness of the liquid crystal layer was 3.5 μm. The sealing material, the liquid crystal layer, and other components may be formed through usual steps for manufacturing a liquid crystal display device.

The respective steps were performed under a yellow fluorescent lamp, and the workpiece was protected from the exposure to the ultraviolet rays from the fluorescent lamp. Thereafter, the liquid crystal display panel was appropriately provided with components such as a polarizing plate and a backlight. Thereby, a liquid crystal display device of Example 1 was obtained.

Comparative Example 1

Comparative Example 1 was performed in the same manner as in Example 1 except that a photo-alignment-film material containing no polyamic acid free from a photo-functional group and a side chain was used. A method for manufacturing a liquid crystal display device according to Comparative Example 1 was the same as that of Example 1 except for the photo-alignment-film material. Thus, the description of the same respects is omitted here.
(Photo-Alignment-Film Material)
A polymer including a methacrylic backbone and a photo-reactive cinnamate group in a side chain was used as a solid matter. A solvent used was a mixture of N-methyl-pyrrolidone and butyl cellosolve at a weight ratio of 50:50. The solid concentration was 4% by weight.

Evaluation Results: Example 1 and Comparative Example 1

For the liquid crystal display devices manufactured by the methods for manufacturing a liquid crystal display device of Example 1 and Comparative Example 1, the voltage holding ratio was evaluated.
(Measurement of Voltage Holding Ratio)

The voltage holding ratio was measured using a liquid crystal material characteristics measurement system (trade name: Model 6254, TOYO Corp.). The applied voltage was 5 V, the holding time was 16.67 ms, and the measurement temperature was 60° C.
(Measurement Results of Voltage Holding Ratio)

A voltage of 5 V was continually applied at 60° C. After 500 hours, the voltage holding ratio in Example 1 was found to be 97% or higher, which was higher than that in Comparative Example 1 (lower than 95%). The voltage holding ratio herein means a ratio of electric charges held to the electric charges charged within one frame period. If the thermochemical reaction insufficiently proceeds in the main heating, the voltage holding ratio may drop. A drop in the voltage holding ratio may cause display unevenness on a liquid crystal display device. Thus, the method for manufacturing a liquid crystal display device of Example 1 can sufficiently improve the voltage holding ratio, thereby sufficiently improving the display quality.

The following will describe the reason why the voltage holding ratio in Example 1 was higher than that in Comparative Example 1. Presumably, impurities contained in the components such as the photo-alignment film and a sealing material are eluted into the liquid crystal and behave as mobile ions, causing a drop in the voltage holding ratio during long-term use under current flow at high temperature. If the photo-alignment-film material contains a polyamic acid free from a photo-functional group and a side chain, as in Example 1, an —NH group and a —COOH group presumably exist on the surface of the photo-alignment film. These —NH and —COOH groups can be adsorptive sites for the aforementioned impurities (mobile ions). Thus, presumably, the mobile ions are immobilized and a drop in the voltage holding ratio can be sufficiently prevented. Accordingly, the method for manufacturing a liquid crystal display device according to Example 1 can sufficiently improve the voltage holding ratio.

Example 2-1

Example 2-1 was performed in the same manner as in Example 1 except that the pre-heating temperature was 60° C. A method for manufacturing a liquid crystal display device according to Example 2-1 was the same as that of Example 1 except for the pre-heating step. Thus, the description of the same respects is omitted here.
(Pre-Heating Step)

The films formed on the two substrates after the step of forming a film from a photo-alignment-film material were pre-heated at 60° C. for 150 seconds.

Example 2-2

Example 2-2 was performed in the same manner as in Example 2-1 except that the pre-heating temperature was 70° C., which was the same as Example 1. A method for manufacturing a liquid crystal display device according to Example 2-2 was the same as that of Example 1. Thus, the description of the same respects is omitted here.

Example 2-3

Example 2-3 was performed in the same manner as in Example 2-1 except that the pre-heating temperature was 80° C. A method for manufacturing a liquid crystal display device according to Example 2-3 was the same as that of Example 2-1 except for the pre-heating step. Thus, the description of the same respects is omitted here.
(Pre-Heating Step)

The films formed on the two substrates after the step of forming a film from a photo-alignment-film material were pre-heated at 80° C. for 150 seconds.

Example 2-4

Example 2-4 was performed in the same manner as in Example 2-1 except that the pre-heating temperature was 90° C. A method for manufacturing a liquid crystal display device according to Example 2-4 was the same as that of Example 2-1 except for the pre-heating step. Thus, the description of the same respects is omitted here.
(Pre-Heating Step)

The films formed on the two substrates after the step of forming a film from a photo-alignment-film material were pre-heated at 90° C. for 150 seconds.

Example 2-5

Example 2-5 was performed in the same manner as in Example 2-1 except that the pre-heating temperature was 100° C. A method for manufacturing a liquid crystal display device according to Example 2-5 was the same as that of Example 2-1 except for the pre-heating step. Thus, the description of the same respects is omitted here.
(Pre-Heating Step)

The films formed on the two substrates after the step of forming a film from a photo-alignment-film material were pre-heated at 100° C. for 150 seconds.

Example 2-6

Example 2-6 was performed in the same manner as in Example 2-1 except that the pre-heating temperature was 110° C. A method for manufacturing a liquid crystal display device according to Example 2-6 was the same as that of Example 2-1 except for the pre-heating step. Thus, the description of the same respects is omitted here.
(Pre-Heating Step)

The films formed on the two substrates after the step of forming a film from a photo-alignment-film material were pre-heated at 110° C. for 150 seconds.

Evaluation Results: Examples 2-1 to 2-6

For the liquid crystal display devices manufactured by the methods for manufacturing a liquid crystal display device of Examples 2-1 to 2-6, the pre-heating temperatures and the results of evaluating the display quality are shown in Table 1.
(Evaluation Method of Display Quality)

The display quality was evaluated on a four-level scale. Level 1: the contrast was not lower than 1200. Level 2: the contrast was not lower than 1000 but lower than 1200. Level 3: the contrast was not lower than 500 but lower than 1000.

Level 4: the contrast was lower than 500 or an alignment defect was visually observed. Those of Levels 1 to 3 were evaluated as suitable for products, whereas those of Level 4 were evaluated as not suitable for products.

(Measurement of Contrast)

The contrast was measured by the formula: (Contrast)= (luminance of white screen)/(luminance of black screen). When the display shows a white screen, a voltage for the maximum luminance is applied. When the display shows a black screen, no voltage is applied. The luminances (luminances of white screen and black screen) were measured using a spectroradiometer (trade name: SR-UL2, Topcon Corp.).

TABLE 1

|  | Pre-heating temperature (° C.) | Evaluation results |
| --- | --- | --- |
| Example 2-1 | 60 | Level 1 |
| Example 2-2 | 70 | Level 1 |
| Example 2-3 | 80 | Level 2 |
| Example 2-4 | 90 | Level 2 |
| Example 2-5 | 100 | Level 3 |
| Example 2-6 | 110 | Level 3 |

(Evaluation Results of Display Quality)

The results of evaluating the display quality in the respective examples are described below.

Example 2-1

The result of evaluating the display quality was Level 1 and was much better than those of Examples 2-3 to 2-6. This is presumably because the orientational order of the polymer by the self-assembly was sufficiently improved. Thus, the method for manufacturing a liquid crystal display device of Example 2-1 can sufficiently improve the display quality.

Example 2-2

The result of evaluating the display quality was Level 1 and was much better than those of Examples 2-3 to 2-6. This is presumably because the orientational order of the polymer by the self-assembly was sufficiently improved. Thus, the method for manufacturing a liquid crystal display device of Example 2-2 can sufficiently improve the display quality.

Example 2-3

The result of evaluating the display quality was Level 2 and was better than those of Examples 2-5 and 2-6. This is presumably because the orientational order of the polymer by the self-assembly was sufficiently improved. Thus, the method for manufacturing a liquid crystal display device of Example 2-3 can sufficiently improve the display quality.

Example 2-4

The result of evaluating the display quality was Level 2 and was better than those of Examples 2-5 and 2-6. This is presumably because the orientational order of the polymer by the self-assembly was sufficiently improved. Thus, the method for manufacturing a liquid crystal display device of Example 2-4 can sufficiently improve the display quality.

Example 2-5

The result of evaluating the display quality was Level 3 and was good. This is presumably because the orientational order of the polymer by the self-assembly was sufficiently improved. Thus, the method for manufacturing a liquid crystal display device of Example 2-5 can sufficiently improve the display quality.

Example 2-6

The result of evaluating the display quality was Level 3 and was good. This is presumably because the orientational order of the polymer by the self-assembly was sufficiently improved. Thus, the method for manufacturing a liquid crystal display device of Example 2-6 can sufficiently improve the display quality.

In Examples 2-1 to 2-6, presumably, the main heating after the polarized ultraviolet irradiation easily causes the molecular motion of the polymer by heating owing to the anisotropy formed by the polarized ultraviolet irradiation, sufficiently improving the orientational order of the polymer by the self-assembly. Further, the orientational order of the polymer by the self-assembly is improved not only by the polymer including a photo-functional group but also by the interaction with the polyamic acid. Thus, easiness of the molecular motion of the polymer is important for such improvement of the orientational order.

The following will describe the reason why the display quality of Example 2-1 and Example 2-2 was much better than that of Examples 2-3 to 2-6. This is presumably because as follows. The pre-heating temperatures in Example 2-1 and Example 2-2 were lower than those in Examples 2-3 to 2-6, and thereby a relatively large amount of the solvent remained. As a result, the molecular motion of the polymer accompanying the main heating became relatively active and the orientational order of the polymer by the self-assembly was sufficiently improved. Thus, presumably, in order to allow the self-assembly to proceed, a certain amount of the solvent preferably remains in the state before the main heating, and too high a pre-heating temperature may inhibit the self-assembly. The pre-heating has only to be performed so as to remove the fluidity of a film formed from the photo-alignment-film material. In order to achieve the effects of one aspect of the present invention, the pre-heating temperature is preferably low. The reason why the display quality of Example 2-3 and Example 2-4 was better than that of Example 2-5 and Example 2-6 is the same as mentioned above. Accordingly, the pre-heating temperature is found to be preferably 90° C. or lower, more preferably 70° C. or lower. If the pre-heating temperature was lower than 40° C., the solvent needs much time to evaporate, and thus an uneven film thickness due to the convection of the solution markedly occurs. As a result, alignment unevenness may possibly be observed when a liquid crystal display device is turned on. Thus, the pre-heating temperature is still more preferably 40° C. or higher and 70° C. or lower.

Example 3-1

Example 3-1 was performed in the same manner as in Example 2-2 except that the main heating temperature was 80° C. A method for manufacturing a liquid crystal display device according to Example 3-1 was the same as that of Example 2-2 except for the main heating step. Thus, the description of the same respects is omitted here.

(Main Heating Step)

The light-irradiated films on the two substrates were main-heated at 80° C. for 10 minutes.

Example 3-2

Example 3-2 was performed in the same manner as in Example 3-1 except that the main heating temperature was 90° C. A method for manufacturing a liquid crystal display device according to Example 3-2 was the same as that of Example 3-1 except for the main heating step. Thus, the description of the same respects is omitted here.
(Main Heating Step)

The light-irradiated films on the two substrates were main-heated at 90° C. for 10 minutes.

Example 3-3

Example 3-3 was performed in the same manner as in Example 3-1 except that the main heating temperature was 100° C. A method for manufacturing a liquid crystal display device according to Example 3-3 was the same as that of Example 3-1 except for the main heating step. Thus, the description of the same respects is omitted here.
(Main Heating Step)

The light-irradiated films on the two substrates were main-heated at 100° C. for 10 minutes.

Example 3-4

Example 3-4 was performed in the same manner as in Example 3-1 except that the main heating temperature was 110° C. A method for manufacturing a liquid crystal display device according to Example 3-4 was the same as that of Example 3-1 except for the main heating step. Thus, the description of the same respects is omitted here.
(Main Heating Step)

The light-irradiated films on the two substrates were main-heated at 110° C. for 10 minutes.

Example 3-5

Example 3-5 was performed in the same manner as in Example 3-1 except that the main heating temperature was 120° C. A method for manufacturing a liquid crystal display device according to Example 3-5 was the same as that of Example 3-1 except for the main heating step. Thus, the description of the same respects is omitted here.
(Main Heating Step)

The light-irradiated films on the two substrates were main-heated at 120° C. for 10 minutes.

Example 3-6

Example 3-6 was performed in the same manner as in Example 3-1 except that the main heating temperature was 130° C. A method for manufacturing a liquid crystal display device according to Example 3-6 was the same as that of Example 3-1 except for the main heating step. Thus, the description of the same respects is omitted here.
(Main Heating Step)

The light-irradiated films on the two substrates were main-heated at 130° C. for 10 minutes.

Example 3-7

Example 3-7 was performed in the same manner as in Example 3-1 except that the main heating temperature was 140° C., which is the same as Example 2-2. A method for manufacturing a liquid crystal display device according to Example 3-7 was the same as that of Example 2-2. Thus, the description of the same respects is omitted here.

Example 3-8

Example 3-8 was performed in the same manner as in Example 3-1 except that the main heating temperature was 150° C. A method for manufacturing a liquid crystal display device according to Example 3-8 was the same as that of Example 3-1 except for the main heating step. Thus, the description of the same respects is omitted here.
(Main Heating Step)

The light-irradiated films on the two substrates were main-heated at 150° C. for 10 minutes.

Evaluation Results: Examples 3-1 to 3-8

For the liquid crystal display devices manufactured by the methods for manufacturing a liquid crystal display device of Examples 3-1 to 3-8, the main heating temperatures and the results of evaluating the display quality are shown in Table 2.
(Evaluation Method of Display Quality)

The display quality was evaluated on a four-level scale in the same manner as in Examples 2-1 to 2-6. Level 1: the contrast was not lower than 1200. Level 2: the contrast was not lower than 1000 but lower than 1200. Level 3: the contrast was not lower than 500 but lower than 1000. Level 4: the contrast was lower than 500 or an alignment defect was visually observed. Those of Level 1 to 3 were evaluated as suitable for products, whereas those of Level 4 were evaluated as not suitable for products.

TABLE 2

|  | Main heating temperature (° C.) | Evaluation results |
| --- | --- | --- |
| Example 3-1 | 80 | Level 3 |
| Example 3-2 | 90 | Level 2 |
| Example 3-3 | 100 | Level 2 |
| Example 3-4 | 110 | Level 2 |
| Example 3-5 | 120 | Level 2 |
| Example 3-6 | 130 | Level 2 |
| Example 3-7 | 140 | Level 1 |
| Example 3-8 | 150 | Level 1 |

(Evaluation Results of Display Quality)

The results of evaluating the display quality in the respective examples are described below.

Example 3-1

The result of evaluating the display quality was Level 3 and was good. This is presumably because the orientational order of the polymer by the self-assembly was sufficiently improved. Thus, the method for manufacturing a liquid crystal display device of Example 3-1 can sufficiently improve the display quality.

Example 3-2

The result of evaluating the display quality was Level 2 and was better than that of Example 3-1. This is presumably because the orientational order of the polymer by the self-assembly was sufficiently improved. Thus, the method for manufacturing a liquid crystal display device of Example 3-2 can sufficiently improve the display quality.

Example 3-3

The result of evaluating the display quality was Level 2 and was better than that of Example 3-1. This is presumably because the orientational order of the polymer by the self-assembly was sufficiently improved. Thus, the method for manufacturing a liquid crystal display device of Example 3-3 can sufficiently improve the display quality.

Example 3-4

The result of evaluating the display quality was Level 2 and was better than that of Example 3-1. This is presumably because the orientational order of the polymer by the self-assembly was sufficiently improved. Thus, the method for manufacturing a liquid crystal display device of Example 3-4 can sufficiently improve the display quality.

Example 3-5

The result of evaluating the display quality was Level 2 and was better than that of Example 3-1. This is presumably because the orientational order of the polymer by the self-assembly was sufficiently improved. Thus, the method for manufacturing a liquid crystal display device of Example 3-5 can sufficiently improve the display quality.

Example 3-6

The result of evaluating the display quality was Level 2 and was better than that of Example 3-1. This is presumably because the orientational order of the polymer by the self-assembly was sufficiently improved. Thus, the method for manufacturing a liquid crystal display device of Example 3-6 can sufficiently improve the display quality.

Example 3-7

The result of evaluating the display quality was Level 1 and was better than those of Examples 3-1 to 3-6. This is presumably because the orientational order of the polymer by the self-assembly was sufficiently improved. Thus, the method for manufacturing a liquid crystal display device of Example 3-7 can sufficiently improve the display quality.

Example 3-8

The result of evaluating the display quality was Level 1 and was better than those of Examples 3-1 to 3-6. This is presumably because the orientational order of the polymer by the self-assembly was sufficiently improved. Thus, the method for manufacturing a liquid crystal display device of Example 3-8 can sufficiently improve the display quality.

In Example 3-1 to 3-8, presumably, the main heating after the polarized ultraviolet irradiation easily causes the molecular motion of the polymer by heating owing to the anisotropy formed by the polarized ultraviolet irradiation, sufficiently improving the orientational order of the polymer by the self-assembly. Further, the orientational order of the polymer by the self-assembly is improved not only by the polymer including a photo-functional group but also by the interaction with the polyamic acid. Thus, easiness of the molecular motion of the polymer is important for such improvement of the orientational order.

The following will describe the reason why the display quality of Example 3-7 and Example 3-8 was much better than that of Examples 3-1 to 3-6. As mentioned above, easiness (activeness) of the molecular motion of the polymer is important for improvement of the orientational order of the polymer by the self-assembly. Thus, presumably, the molecular motion of the polymer is relatively active because the main heating temperatures in Example 3-7 and Example 3-8 are higher than those in Examples 3-1 to Example 3-6.

If the temperature during the self-assembly is too low, the molecular motion of the polymer is presumably not activated relatively. The reason why the display quality of Examples 3-2 to 3-6 was better than that of Example 3-1 is also the same as mentioned above. Accordingly, the main heating temperature was found to be preferably 90° C. or higher, more preferably 140° C. or higher. If the main heating temperature exceeds 250° C., the color filter layer may be faded and the display quality of the liquid crystal display device may be degraded. Thus, the main heating temperature is still more preferably 140° C. or higher and 250° C. or lower.

Example 4

Example 4 was performed in the same manner as in Example 1 except that a liquid crystal material containing liquid crystal molecules having negative anisotropy of dielectric constant was used. A method for manufacturing a liquid crystal display device according to Example 4 was the same as that of Example 1 except for the anisotropy of dielectric constant of the liquid crystal molecules. Thus, the description of the same respects is omitted here.

Comparative Example 2

In Comparative Example 2, a degradable photo-alignment film was used and the light irradiation step was performed after the main heating step. The following describes a method for manufacturing a liquid crystal display device according to Comparative Example 2.
(Photo-Alignment-Film Material)
A polyamide acid polymer including a cyclobutane backbone was used as a solid matter. A solvent used was a mixture of N-methyl-pyrrolidone and butyl cellosolve at a weight ratio of 50:50. The solid concentration was 4% by weight. The photo-alignment film used in Comparative Example 2 is a film whose polymer chain is photo-degradable at a center wavelength of around 254 nm.
(Step of Forming Film from Photo-Alignment-Film Material)
A film was formed on each of two substrates from the photo-alignment-film material by spin-coating.
(Pre-Heating Step)
The films on the two substrates after the step of forming a film from a photo-alignment-film material were pre-heated at 90° C. for 150 seconds. The pre-heating was performed using a hot plate (trade name: EC-1200N, As One Corp.). The pre-heated films formed from the photo-alignment-film material had a thickness of about 100 nm.
(Main Heating Step)
The pre-heated films on the two substrates were main-heated at 230° C. for 30 minutes. The main heating was performed using a hot plate (trade name: EC-1200N, As One Corp.).
(Light Irradiation Step)
The main-heated films on the two substrates were irradiated with polarized ultraviolet rays. The dose of the polarized ultraviolet rays was 1 $J/cm^2$ at a center wavelength of around 254 nm.

Thereafter, the two substrates after the light irradiation step were assembled with each other in the same manner as in the method for manufacturing a liquid crystal display device of Example 1, and thereby an FFS-mode liquid crystal display panel was obtained. This display panel was appropriately provided with components such as a polarizing plate and a backlight. Thereby, a liquid crystal display device according to Comparative Example 2 was obtained. The liquid crystal material used was one containing liquid crystal molecules having negative anisotropy of dielectric constant, and the thickness of the liquid crystal layer was 3.5 µm.

Evaluation Results: Example 4 and Comparative Example 2

For the liquid crystal display devices manufactured by the methods for manufacturing a liquid crystal display device of Example 4 and Comparative Example 2, the contrast, the image sticking characteristics, and the voltage holding ratio were evaluated. The cases satisfying a contrast of 500 or higher, image sticking characteristics (image sticking rate) of within 5%, and a voltage holding ratio of 97% or higher were evaluated as suitable for products. The contrast was determined in the same manner as in Examples 2-1 to 2-6, and the voltage holding ratio was determined in the same manner as in Example 1.
(Measurement Results of Contrast)
The contrasts in Example 4 and Comparative Example 2 were both about 1200 and equivalent to each other, which were at a level suitable for products.
(Evaluation of Image Sticking Characteristics)
The image sticking characteristics were evaluated by the image sticking rate. A voltage for the maximum luminance is expressed as Vmax and a voltage for 1% of the maximum luminance is expressed as an observation voltage V1 (V1<Vmax). At first, the luminance (L1) with application of the observation voltage V1 was measured. Next, the voltage Vmax was continually applied for six hours, and then the luminance (L1') with application of the observation voltage V1 was measured. Then, the rate of change of L1' to L1 was defined as an image sticking rate. The luminance was measured using a digital camera (trade name: EOS Kiss Digital NEF-S18-55IIU, Canon Inc.).
(Evaluation Results of Image Sticking Characteristics)
The image sticking rates in Example 4 and Comparative Example 2 were both about 3% and equivalent to each other, which were at a level suitable for products.
(Measurement Results of Voltage Holding Ratio)
A voltage of 5 V was continually applied at 60° C. After 500 hours, the voltage holding ratios in Example 4 and Comparative Example 2 were both 98% or higher and equivalent to each other, which were at a level suitable for products.

In Comparative Example 2, however, the continual application of a voltage of 5 V at 60° C. for 500 hours generated minute bright points in pixels, causing display failure.

This is presumably because, in Comparative Example 2, the photo-degradation of the polymer chain is a main mechanism for forming the alignment anisotropy. In Comparative Example 2, presumably, low-molecular-weight degradation products were produced by the polarized ultraviolet irradiation and attached to the surface of the photo-alignment film in an early stage, but the degradation products were eluted into the liquid crystal and aggregated therein during the long term test, so that the degradation products served as bright points. Thus, as in the case of the method for manufacturing a liquid crystal display device of Example 4, the display quality can be sufficiently improved by a photo-alignment film whose main mechanism for forming the alignment anisotropy is not photo-degradation but at least one chemical reaction selected from the group consisting of photodimerization, photoisomerization, and photo-Fries rearrangement.

Bright points as in Comparative Example 2 tend to occur more markedly with a liquid crystal material containing liquid crystal molecules having negative anisotropy of dielectric constant than with a liquid crystal material containing liquid crystal molecules having positive anisotropy of dielectric constant. A liquid crystal material containing liquid crystal molecules having negative anisotropy of dielectric constant can more improve the transmittance and the viewing angle characteristics. Thus, the use of a liquid crystal material containing liquid crystal molecules having negative anisotropy of dielectric constant in the method for manufacturing a liquid crystal display device according to one aspect of the present invention leads to the effects of one aspect of the present invention, as well as more improves the transmittance and the viewing angle characteristics.

Example 5

In Example 5, a photo-alignment-film material containing two polymers was used. The following describes a method for manufacturing a liquid crystal display device according to Example 5.
(Structure of Liquid Crystal Display Device)
A liquid crystal display device has an FFS-mode electrode structure, and the pre-tilt angle is 0°.
(Photo-Alignment-Film Material)
A mixture of two polymers at a weight ratio of 50:50 was used as a solid matter. One of the two polymers is a polymer including a photo-reactive azobenzene structure, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of N-methyl-pyrrolidone and butyl cellosolve at a weight ratio of 50:50. The solid concentration was 4% by weight. The azobenzene group is a photoisomerizable photo-functional group.
(Step of Forming Film from Photo-Alignment-Film Material)
A film was formed on each of two substrates from the photo-alignment-film material by spin-coating.
(Pre-Heating Step)
The films on the two substrates after the step of forming a film from a photo-alignment-film material were pre-heated at 70° C. for 150 seconds. The pre-heating was performed using a hot plate (trade name: EC-1200N, As One Corp.). The pre-heated films formed from the photo-alignment-film material had a thickness of about 100 nm.
(Light Irradiation Step)
The pre-heated films on the two substrates were irradiated with polarized ultraviolet rays. The dose of the polarized ultraviolet rays was 3 J/cm$^2$ at a center wavelength of around 365 nm.
(Main Heating Step)
The light-irradiated films on the two substrates were main-heated at 140° C. for 10 minutes. The main heating was performed using a hot plate (trade name: EC-1200N, As One Corp.).

Thereafter, the two substrates after the main heating step were assembled in the same manner as the method for manufacturing a liquid crystal display device of Example 1, and thereby an FFS-mode liquid crystal display panel was obtained. This display panel was appropriately provided with components such as a polarizing plate and a backlight. Thereby, a liquid crystal display device according to Example 5 was obtained. The liquid crystal material used was one containing liquid crystal molecules having positive anisotropy of dielectric constant, and the thickness of the liquid crystal layer was 3.5 μm.

Comparative Example 3

Comparative Example 3 was performed in the same manner as in Example 5 except that a photo-alignment-film material containing no polyamic acid which is free from a photo-functional group and a side chain was used. A method for manufacturing a liquid crystal display device according to Comparative Example 3 was the same as that of Example 5 except for the photo-alignment-film material. Thus, the description of the same respects is omitted here.
(Photo-Alignment-Film Material)
A polymer including a photo-reactive azobenzene structure was used as a solid matter. A solvent used was a mixture of N-methyl-pyrrolidone and butyl cellosolve at a weight ratio of 50:50. The solid concentration was 4% by weight.

Evaluation Results: Example 5 and Comparative Example 3

A voltage of 5 V was continually applied at 60° C. to the liquid crystal display devices manufactured by the methods for manufacturing a liquid crystal display device of Example 5 and Comparative Example 3. After 500 hours, the voltage holding ratio in Example 5 was found to be about 95% to 97%, which was higher than that in Comparative Example 3 (lower than 90%). A drop in the voltage holding ratio may cause display unevenness on a liquid crystal display device. Thus, the method for manufacturing a liquid crystal display device of Example 5 can sufficiently improve the voltage holding ratio, thereby sufficiently improving the display quality.

The following will describe the reason why the voltage holding ratio in Example 5 was higher than that in Comparative Example 3. Presumably, impurities contained in the components such as the photo-alignment film and a sealing material are eluted into the liquid crystal and behave as mobile ions, causing a drop in the voltage holding ratio during long-term use under current flow at high temperature. If the photo-alignment-film material contains a polyamic acid free from a photo-functional group and a side chain, as in Example 5, an —NH group and a —COOH group presumably exist on the surface of the photo-alignment film. These —NH and —COOH groups can be adsorptive sites for the aforementioned impurities (mobile ions). Thus, presumably, the mobile ions are immobilized and a drop in the voltage holding ratio can be sufficiently prevented. Accordingly, the method for manufacturing a liquid crystal display device according to Example 5 can sufficiently improve the voltage holding ratio.

Example 6

Example 6 was performed in the same manner as in Example 5 except that a liquid crystal material containing liquid crystal molecules having negative anisotropy of dielectric constant was used. A method for manufacturing a liquid crystal display device according to Example 6 was the same as that of Example 5 except for the anisotropy of dielectric constant of the liquid crystal molecules. Thus, the description of the same respects is omitted here.

Comparative Example 4

In Comparative Example 4, a degradable photo-alignment film was used and the light irradiation step was performed after the main heating step. The following describes a method for manufacturing a liquid crystal display device according to Comparative Example 4.
(Photo-Alignment-Film Material)
A polyamide acid polymer including a cyclobutane backbone was used as a solid matter. A solvent used was a mixture of N-methyl-pyrrolidone and butyl cellosolve at a weight ratio of 50:50. The solid concentration was 4% by weight. The photo-alignment film used in Comparative Example 4 is a film whose polymer chain is photo-degradable at a center wavelength of around 254 nm.
(Step of Forming Film from Photo-Alignment-Film Material)
A film was formed on each of two substrates from the photo-alignment-film material by spin-coating.
(Pre-Heating Step)
The films on the two substrates after the step of forming a film from a photo-alignment-film material were pre-heated at 90° C. for 150 seconds. The pre-heating was performed using a hot plate (trade name: EC-1200N, As One Corp.). The pre-heated films formed from the photo-alignment-film material had a thickness of about 100 nm.
(Main Heating Step)
The pre-heated films on the two substrates were main-heated at 230° C. for 30 minutes. The main heating was performed using a hot plate (trade name: EC-1200N, As One Corp.).
(Light Irradiation Step)
The main-heated films on the two substrates were irradiated with polarized ultraviolet rays. The dose of the polarized ultraviolet rays was 1 J/cm$^2$ at a center wavelength of around 254 nm.

Thereafter, the two substrates after the light irradiation step were assembled with each other in the same manner as in the method for manufacturing a liquid crystal display device of Example 1, and thereby an FFS-mode liquid crystal display panel was obtained. This display panel was appropriately provided with components such as a polarizing plate and a backlight. Thereby, a liquid crystal display device according to Comparative Example 4 was obtained. The liquid crystal material used was one containing liquid crystal molecules having negative anisotropy of dielectric constant, and the thickness of the liquid crystal layer was 3.5 μm.

Evaluation Results: Example 6 and Comparative Example 4

For the liquid crystal display devices manufactured by the methods for manufacturing a liquid crystal display device of Example 6 and Comparative Example 4, the contrast, the image sticking characteristics, and the voltage holding ratio were evaluated. The cases satisfying a contrast of 500 or higher, image sticking characteristics (image sticking rate) of within 5%, and a voltage holding ratio of 97% or higher were evaluated as suitable for products. The contrast was determined in the same manner as in Examples 2-1 to 2-6, the image sticking characteristics were evaluated in the same manner as in Example 4, and the voltage holding ratio was determined in the same manner as in Example 1.
(Measurement Results of Contrast)
The contrasts in Example 6 and Comparative Example 4 were both about 1200 and equivalent to each other, which were at a level suitable for products.

(Evaluation Results of Image Sticking Characteristics)

The image sticking rates in Example 6 and Comparative Example 4 were both about 3% and equivalent to each other, which were at a level suitable for products.

(Measurement Results of Voltage Holding Ratio)

A voltage of 5 V was continually applied at 60° C. After 500 hours, the voltage holding ratios in Example 6 and Comparative Example 4 were both 98% or higher and equivalent to each other, which were at a level suitable for products.

In Comparative Example 4, however, the continual application of a voltage of 5 V at 60° C. for 500 hours generated minute bright points in pixels, causing display failure.

This is presumably because, in Comparative Example 4, the photo-degradation of the polymer chain is a main mechanism for forming the alignment anisotropy. In Comparative Example 4, presumably, low-molecular-weight degradation products were produced by the polarized ultraviolet irradiation and attached to the surface of the photo-alignment film in an early stage, but the degradation products were eluted into the liquid crystal and aggregated therein during the long term test, so that the degradation products served as bright points. Thus, as in the case of the method for manufacturing a liquid crystal display device of Example 6, the display quality can be sufficiently improved by a photo-alignment film whose main mechanism for forming the alignment anisotropy is not photo-degradation but at least one chemical reaction selected from the group consisting of photodimerization, photoisomerization, and photo-Fries rearrangement.

Bright points as in Comparative Example 4 tend to occur more markedly with a liquid crystal material containing liquid crystal molecules having negative anisotropy of dielectric constant than with a liquid crystal material containing liquid crystal molecules having positive anisotropy of dielectric constant. A liquid crystal material containing liquid crystal molecules having negative anisotropy of dielectric constant can more improve the transmittance and the viewing angle characteristics. Thus, the use of a liquid crystal material containing liquid crystal molecules having negative anisotropy of dielectric constant in the method for manufacturing a liquid crystal display device according to one aspect of the present invention leads to the effects of one aspect of the present invention, as well as more improves the transmittance and the viewing angle characteristics.

Example 7-1

In Example 7-1, the main heating was performed twice at different temperatures in the step (4). The following describes a method for manufacturing a liquid crystal display device according to Example 7-1.

(Structure of Liquid Crystal Display Device)

A liquid crystal display device has an FFS-mode electrode structure, and the pre-tilt angle is 0°.

(Photo-Alignment-Film Material)

A mixture of two polymers at a weight ratio of 50:50 was used as a solid matter. One of the two polymers is a polymer including a photo-reactive azobenzene structure, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of N-methyl-pyrrolidone and butyl cellosolve at a weight ratio of 50:50. The solid concentration was 4% by weight.

(Step of Forming Film from Photo-Alignment-Film Material)

A film was formed on each of two substrates from the photo-alignment-film material by spin-coating.

(Pre-Heating Step)

The films on the two substrates after the step of forming a film from a photo-alignment-film material were pre-heated at 60° C. for 150 seconds. The pre-heating was performed using a hot plate (trade name: EC-1200N, As One Corp.). The pre-heated films formed from the photo-alignment-film material had a thickness of about 100 nm.

(Light Irradiation Step)

The pre-heated films on the two substrates were irradiated with polarized ultraviolet rays. The dose of the polarized ultraviolet rays was 1 J/cm$^2$ at a center wavelength of around 365 nm.

(First Main Heating Step)

The light-irradiated films on the two substrates were main-heated at 110° C. for 10 minutes. The main heating was performed using a hot plate (trade name: EC-1200N, As One Corp.).

(Second Main Heating Step)

The first-main-heated films on the two substrates were main-heated at 200° C. for 30 minutes. The main heating was performed using a hot plate (trade name: EC-1200N, As One Corp.).

Thereafter, the two substrates after the second main heating step were assembled in the same manner as in the method for manufacturing a liquid crystal display device of Example 1, and thereby an FFS-mode liquid crystal display panel was obtained. This display panel was appropriately provided with components such as a polarizing plate and a backlight. Thereby, a liquid crystal display device according to Example 7-1 was obtained. The liquid crystal material used was one containing liquid crystal molecules having negative anisotropy of dielectric constant, and the thickness of the liquid crystal layer was 3.5 µm.

Example 7-2

Example 7-2 was performed in the same manner as in Example 7-1 except that the pre-heating temperature was 70° C. A method for manufacturing a liquid crystal display device according to Example 7-2 was the same as that of Example 7-1 except for the pre-heating step. Thus, the description of the same respects is omitted here.

(Pre-Heating Step)

The films formed on the two substrates after the step of forming a film from a photo-alignment-film material were pre-heated at 70° C. for 150 seconds.

Example 7-3

Example 7-3 was performed in the same manner as in Example 7-1 except that the pre-heating temperature was 80° C. A method for manufacturing a liquid crystal display device according to Example 7-3 was the same as that of Example 7-1 except for the pre-heating step. Thus, the description of the same respects is omitted here.

(Pre-Heating Step)

The films formed on the two substrates after the step of forming a film from a photo-alignment-film material were pre-heated at 80° C. for 150 seconds.

Example 7-4

Example 7-4 was performed in the same manner as in Example 7-1 except that the pre-heating temperature was 90° C. A method for manufacturing a liquid crystal display device according to Example 7-4 was the same as that of Example 7-1 except for the pre-heating step. Thus, the description of the same respects is omitted here.

(Pre-Heating Step)

The films formed on the two substrates after the step of forming a film from a photo-alignment-film material were pre-heated at 90° C. for 150 seconds.

Example 7-5

Example 7-5 was performed in the same manner as in Example 7-1 except that the pre-heating temperature was 100° C. A method for manufacturing a liquid crystal display device according to Example 7-5 was the same as that of Example 7-1 except for the pre-heating step. Thus, the description of the same respects is omitted here.

(Pre-Heating Step)

The films formed on the two substrates after the step of forming a film from a photo-alignment-film material were pre-heated at 100° C. for 150 seconds.

Example 7-6

Example 7-6 was performed in the same manner as in Example 7-1 except that the pre-heating temperature was 110° C. A method for manufacturing a liquid crystal display device according to Example 7-6 was the same as that of Example 7-1 except for the pre-heating step. Thus, the description of the same respects is omitted here.

(Pre-Heating Step)

The films formed on the two substrates after the step of forming a film from a photo-alignment-film material were pre-heated at 110° C. for 150 seconds.

Evaluation Results: Examples 7-1 to 7-6

For the liquid crystal display devices manufactured by the methods for manufacturing a liquid crystal display device of Examples 7-1 to 7-6, the pre-heating temperatures and the results of evaluating the display quality are shown in Table 3.

(Evaluation Method of Display Quality)

The display quality was evaluated on a four-level scale in the same manner as in Examples 2-1 to 2-6. Level 1: the contrast was not lower than 1200. Level 2: the contrast was not lower than 1000 but lower than 1200. Level 3: the contrast was not lower than 500 but lower than 1000. Level 4: the contrast was lower than 500 or an alignment defect was visually observed. Those of Levels 1 to 3 were evaluated as suitable for products, whereas those of Level 4 were evaluated as not suitable for products.

TABLE 3

| | Pre-heating temperature (° C.) | Evaluation results |
|---|---|---|
| Example 7-1 | 60 | Level 1 |
| Example 7-2 | 70 | Level 1 |
| Example 7-3 | 80 | Level 2 |
| Example 7-4 | 90 | Level 2 |
| Example 7-5 | 100 | Level 3 |
| Example 7-6 | 110 | Level 3 |

(Evaluation Results of Display Quality)

The results of evaluating the display quality in the respective examples are described below.

Example 7-1

The result of evaluating the display quality was Level 1 and was much better than those of Examples 7-3 to 7-6. This is presumably because the orientational order of the polymer by the self-assembly was sufficiently improved. Thus, the method for manufacturing a liquid crystal display device of Example 7-1 can sufficiently improve the display quality.

Example 7-2

The result of evaluating the display quality was Level 1 and was much better than those of Examples 7-3 to 7-6. This is presumably because the orientational order of the polymer by the self-assembly was sufficiently improved. Thus, the method for manufacturing a liquid crystal display device of Example 7-2 can sufficiently improve the display quality.

Example 7-3

The result of evaluating the display quality was Level 2 and was better than those of Examples 7-5 and 7-6. This is presumably because the orientational order of the polymer by the self-assembly was sufficiently improved. Thus, the method for manufacturing a liquid crystal display device of Example 7-3 can sufficiently improve the display quality.

Example 7-4

The result of evaluating the display quality was Level 2 and was better than those of Examples 7-5 and 7-6. This is presumably because the orientational order of the polymer by the self-assembly was sufficiently improved. Thus, the method for manufacturing a liquid crystal display device of Example 7-4 can sufficiently improve the display quality.

Example 7-5

The result of evaluating the display quality was Level 3 and was good. This is presumably because the orientational order of the polymer by the self-assembly was sufficiently improved. Thus, the method for manufacturing a liquid crystal display device of Example 7-5 can sufficiently improve the display quality.

Example 7-6

The result of evaluating the display quality was Level 3 and was good. This is presumably because the orientational order of the polymer by the self-assembly was sufficiently improved. Thus, the method for manufacturing a liquid crystal display device of Example 7-6 can sufficiently improve the display quality.

The following will describe the reason why the display quality of Example 7-1 and Example 7-2 was much better than that of Examples 7-3 to 7-6. This is presumably because as follows. The pre-heating temperatures in Example 7-1 and Example 7-2 were lower than those in Examples 7-3 to 7-6, and thereby a relatively large amount of the solvent remained. As a result, the molecular motion of the polymer accompanying the main heating became relatively active and the orientational order of the polymer by the self-assembly was sufficiently improved. Thus, presumably, in order to allow the self-assembly to proceed, a certain amount of the solvent preferably remains in the state before the main heating, and too high a pre-heating temperature may inhibit the self-assembly. The pre-heating has only to be performed so as to remove the fluidity of a film formed from the photo-alignment-film material. In order to achieve the effects of one aspect of the present invention, the pre-heating temperature is preferably low. The reason why the display quality of Example 7-3 and Example 7-4 was better than that of Example 7-5 and Example 7-6 is the same as mentioned above. Accordingly, the pre-heating temperature is found to be preferably 90° C. or lower, more preferably 70° C. or lower. If the pre-heating temperature was lower than 40° C., the solvent needs much time to evaporate, and thus an uneven film thickness due to the convection of the solution markedly occurs. As a result, alignment unevenness may possibly be observed when a liquid crystal display device is turned on. Thus, the pre-heating temperature is still more preferably 40° C. or higher and 70° C. or lower.

Example 8-1

Example 8-1 was performed in the same manner as in Example 7-1 except that the first main heating temperature was 70° C. A method for manufacturing a liquid crystal display device according to Example 8-1 was the same as that of Example 7-1 except for the first main heating step. Thus, the description of the same respects is omitted here.
(First Main Heating Step)
The light-irradiated films on the two substrates were main-heated at 70° C. for 10 minutes.

Example 8-2

Example 8-2 was performed in the same manner as in Example 8-1 except that the first main heating temperature was 80° C. A method for manufacturing a liquid crystal display device according to Example 8-2 was the same as that of Example 8-1 except for the first main heating step. Thus, the description of the same respects is omitted here.
(First Main Heating Step)
The light-irradiated films on the two substrates were main-heated at 80° C. for 10 minutes.

Example 8-3

Example 8-3 was performed in the same manner as in Example 8-1 except that the first main heating temperature was 90° C. A method for manufacturing a liquid crystal display device according to Example 8-3 was the same as that of Example 8-1 except for the first main heating step. Thus, the description of the same respects is omitted here.
(First Main Heating Step)
The light-irradiated films on the two substrates were main-heated at 90° C. for 10 minutes.

Example 8-4

Example 8-4 was performed in the same manner as in Example 8-1 except that the first main heating temperature was 100° C. A method for manufacturing a liquid crystal display device according to Example 8-4 was the same as that of Example 8-1 except for the first main heating step. Thus, the description of the same respects is omitted here.
(First Main Heating Step)
The light-irradiated films on the two substrates were main-heated at 100° C. for 10 minutes.

Example 8-5

Example 8-5 was performed in the same manner as in Example 8-1 except that the first main heating temperature was 110° C., which is the same as Example 7-1. A method for manufacturing a liquid crystal display device according to Example 8-5 was the same as that of Example 7-1. Thus, the description of the same respects is omitted here.

Example 8-6

Example 8-6 was performed in the same manner as in Example 8-1 except that the first main heating temperature was 120° C. A method for manufacturing a liquid crystal display device according to Example 8-6 was the same as that of Example 8-1 except for the first main heating step. Thus, the description of the same respects is omitted here.
(First Main Heating Step)
The light-irradiated films on the two substrates were main-heated at 120° C. for 10 minutes.

Example 8-7

Example 8-7 was performed in the same manner as in Example 8-1 except that the first main heating temperature was 130° C. A method for manufacturing a liquid crystal display device according to Example 8-7 was the same as that of Example 8-1 except for the first main heating step. Thus, the description of the same respects is omitted here.
(First Main Heating Step)
The light-irradiated films on the two substrates were main-heated at 130° C. for 10 minutes.

Example 8-8

Example 8-8 was performed in the same manner as in Example 8-1 except that the first main heating temperature was 140° C. A method for manufacturing a liquid crystal display device according to Example 8-8 was the same as that of Example 8-1 except for the first main heating step. Thus, the description of the same respects is omitted here.
(First Main Heating Step)
The light-irradiated films on the two substrates were main-heated at 140° C. for 10 minutes.

Example 8-9

Example 8-9 was performed in the same manner as in Example 8-1 except that the first main heating temperature was 150° C. A method for manufacturing a liquid crystal display device according to Example 8-9 was the same as that of Example 8-1 except for the first main heating step. Thus, the description of the same respects is omitted here.
(First Main Heating Step)
The light-irradiated films on the two substrates were main-heated at 150° C. for 10 minutes.

Example 8-10

Example 8-10 was performed in the same manner as in Example 8-1 except that the first main heating temperature was 160° C. A method for manufacturing a liquid crystal display device according to Example 8-10 was the same as that of Example 8-1 except for the first main heating step. Thus, the description of the same respects is omitted here.
(First Main Heating Step)

The light-irradiated films on the two substrates were main-heated at 160° C. for 10 minutes.

Evaluation Results: Examples 8-1 to 8-10

For the liquid crystal display devices manufactured by the methods for manufacturing a liquid crystal display device of Examples 8-1 to 8-10, the first main heating temperatures and the results of evaluating the display quality are shown in Table 4.
(Evaluation Method of Display Quality)

The display quality was evaluated on a three-level scale in the same manner as in Examples 2-1 to 2-6. Level 1: the contrast was not lower than 1200. Level 2: the contrast was not lower than 500 but lower than 1200. Level 3: the contrast was lower than 500 or an alignment defect was visually observed. Those of Level 1 or 2 were evaluated as suitable for products, whereas those of Level 3 were evaluated as not suitable for products.

TABLE 4

|  | First main heating temperature (° C.) | Evaluation results |
| --- | --- | --- |
| Example 8-1 | 70 | Level 2 |
| Example 8-2 | 80 | Level 2 |
| Example 8-3 | 90 | Level 1 |
| Example 8-4 | 100 | Level 1 |
| Example 8-5 | 110 | Level 1 |
| Example 8-6 | 120 | Level 1 |
| Example 8-7 | 130 | Level 1 |
| Example 8-8 | 140 | Level 1 |
| Example 8-9 | 150 | Level 2 |
| Example 8-10 | 160 | Level 2 |

(Evaluation Results of Display Quality)

The results of evaluating the display quality in the respective examples are described below.

Example 8-1

The result of evaluating the display quality was Level 2 and was good. This is presumably because the orientational order of the polymer by the self-assembly was sufficiently improved. Thus, the method for manufacturing a liquid crystal display device of Example 8-1 can sufficiently improve the display quality.

Example 8-2

The result of evaluating the display quality was Level 2 and was good. This is presumably because the orientational order of the polymer by the self-assembly was sufficiently improved. Thus, the method for manufacturing a liquid crystal display device of Example 8-2 can sufficiently improve the display quality.

Example 8-3

The result of evaluating the display quality was Level 1 and was very good. This is presumably because the orientational order of the polymer by the self-assembly was sufficiently improved. Thus, the method for manufacturing a liquid crystal display device of Example 8-3 can sufficiently improve the display quality.

Example 8-4

The result of evaluating the display quality was Level 1 and was very good. This is presumably because the orientational order of the polymer by the self-assembly was sufficiently improved. Thus, the method for manufacturing a liquid crystal display device of Example 8-4 can sufficiently improve the display quality.

Example 8-5

The result of evaluating the display quality was Level 1 and was very good. This is presumably because the orientational order of the polymer by the self-assembly was sufficiently improved. Thus, the method for manufacturing a liquid crystal display device of Example 8-5 can sufficiently improve the display quality.

Example 8-6

The result of evaluating the display quality was Level 1 and was very good. This is presumably because the orientational order of the polymer by the self-assembly was sufficiently improved. Thus, the method for manufacturing a liquid crystal display device of Example 8-6 can sufficiently improve the display quality.

Example 8-7

The result of evaluating the display quality was Level 1 and was very good. This is presumably because the orientational order of the polymer by the self-assembly was sufficiently improved. Thus, the method for manufacturing a liquid crystal display device of Example 8-7 can sufficiently improve the display quality.

Example 8-8

The result of evaluating the display quality was Level 1 and was very good. This is presumably because the orientational order of the polymer by the self-assembly was sufficiently improved. Thus, the method for manufacturing a liquid crystal display device of Example 8-8 can sufficiently improve the display quality.

Example 8-9

The result of evaluating the display quality was Level 2 and was good. This is presumably because the orientational order of the polymer by the self-assembly was sufficiently improved. Thus, the method for manufacturing a liquid crystal display device of Example 8-9 can sufficiently improve the display quality.

Example 8-10

The result of evaluating the display quality was Level 2 and was good. This is presumably because the orientational order of the polymer by the self-assembly was sufficiently improved. Thus, the method for manufacturing a liquid crystal display device of Example 8-10 can sufficiently improve the display quality.

The following will describe the reason why the display quality of Examples 8-3 to 8-8 was much better than that of the other examples. As mentioned above, easy (active) molecular motion of the polymer is important for improvement in the orientational order of the polymer by the self-assembly. If the self-assembly temperature (for example, the first main heating temperature) is too low, the molecular motion of the polymer may presumably be relatively inactive. If the self-assembly temperature is too high, anisotropy is formed by the self-assembly and the thermochemical reaction of the polymer and the evaporation of the residual solvent occur at the same time, so that the self-assembly fails to sufficiently proceed. Thus, the first main heating temperatures (about 90° C. to 140° C.) of Examples 8-3 to 8-8 were presumably temperatures where the self-assembly predominantly occurs. Thereby, the display quality of Examples 8-3 to 8-8 was much better than that of the other examples.

Accordingly, the first main heating temperature was found to be preferably 90° C. or higher and 140° C. or lower. If the first main heating temperature is lower than 90° C., the molecular motion of the polymer may fail to be active. If the first main heating temperature exceeds 140° C., the thermochemical reaction of the polymer and the evaporation of the residual solvent may markedly start, possibly inhibiting the self-assembly. The first main heating was performed for 10 minutes. This main heating is a step of allowing the self-assembly to proceed, and thus similar effects can obviously be achieved if the main heating is continued longer than this time period. The time period of the first main heating is preferably one minute or longer, still more preferably 10 minutes or longer. If the time period of the first main heating was shorter than one minute, the self-assembly may fail to sufficiently proceed.

Evaluation Results: Examples 7-1 to 7-6, Examples 8-1 to 8-10, and Example 5

A voltage of 5 V was continually applied at 60° C. to the liquid crystal display devices manufactured by the methods for manufacturing a liquid crystal display device of Examples 7-1 to 7-6, Examples 8-1 to 8-10, and Example 5. After 500 hours, the voltage holding ratios in Examples 7-1 to 7-6 and Examples 8-1 to 8-10 were found to be 98% or higher, which were higher than that in Example 5 (about 95% to 97%). A drop in the voltage holding ratio may cause display unevenness on a liquid crystal display device. Thus, the methods for manufacturing a liquid crystal display device of Examples 7-1 to 7-6 and Examples 8-1 to 8-10 can more improve the voltage holding ratio, thereby more improving the display quality than the method for manufacturing a liquid crystal display device of Example 5.

This is presumably because additional main heating such as the second main heating step allows the residual solvent to evaporate, so that the amount of the residual solvent can sufficiently be reduced. Since no additional main heating was performed in Example 5, a large amount of the solvent presumably remains. Presumably, it is eluted into the liquid crystal and behaves as impurities during long-term use of the liquid crystal display device, causing a drop in the voltage holding ratio. Thus, the methods for manufacturing a liquid crystal display device of Examples 7-1 to 7-6 and Examples 8-1 to 8-10 can more improve the voltage holding ratio than the method for manufacturing a liquid crystal display device of Example 5.

If the second main heating step was performed after the light irradiation step in Examples 7-1 to 7-6 and Examples 8-1 to 8-10, in other words, if the pre-heated film was main-heated at 200° C. immediately after the polarized ultraviolet irradiation, the anisotropy by the self-assembly was formed, and the thermochemical reaction (thermal imidization) of the polyamic acid and the evaporation of the residual solvent simultaneously occurred. However, the polymer chain after a sufficiently proceeded thermal reaction has a higher rigidity than polyamic acid, and thus has poor thermal mobility, possibly inhibiting the self-assembly. Further, as mentioned above, the molecular motion of the polymer more easily occurs and the self-assembly more easily proceeds when a certain amount of the solvent remains in the state before the main heating. Consequently, in order to sufficiently improve the orientational order of the polymer by the self-assembly and sufficiently improve the display quality, the main heating is preferably first performed at a temperature where the self-assembly predominantly occurs so as to allow the self-assembly to sufficiently proceed, and then, preferably, the evaporation of the residual solvent is caused.

In Examples 7-1 to 7-6 and Examples 8-1 to 8-10, the main heating was performed using two hot plates set to different temperatures. In contrast, using a single hot plate, the second main heating can be performed by changing the temperature up to the second main heating temperature after the first main heating. In this case, the main heating was substantially performed even at temperatures between the first main heating temperature and the second main heating temperature, but the display quality can be sufficiently improved. This is presumably because the self-assembly and the evaporation of the residual solvent proceeded at the same time during the temperature increase of the hot plate. In the cases of using two hot plates, the footprint of heaters is increased. Still, these cases do not require time for decreasing the hot plate temperature down to the first main heating temperature after the second main heating, contrary to the cases of using a single hot plate. Thus, the production efficiency can be more improved. With two hot plates, the substrate temperature may decrease for an instant when the substrate is transferred between the hot plates. Still, such a decrease causes no problem in solving the problems of the present invention. With a single hot plate, the footprint of the heater can be more reduced and the degree of freedom of the device layout can be improved.

Example 9-1

In Example 9-1, the main heating was performed twice at different temperatures and, between the first main heating (the first main heating step) and the second main heating (the second main heating step), the first-main-heated film was irradiated with light (the second light irradiation step) in the step (4). The following describes a method for manufacturing a liquid crystal display device according to Example 9-1.
(Structure of Liquid Crystal Display Device)
A liquid crystal display device has an FFS-mode electrode structure, and the pre-tilt angle is 0°.
(Photo-Alignment-Film Material)
A mixture of two polymers at a weight ratio of 50:50 was used as a solid matter. One of the two polymers is a polymer including a methacrylic backbone and a photo-reactive cinnamate group in a side chain, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of N-methyl-pyrrolidone and butyl cellosolve at a weight ratio of 50:50. The solid concentration was 4% by weight.
(Step of Forming Film from Photo-Alignment-Film Material)

A film was formed on each of two substrates from the photo-alignment-film material by spin-coating.
(Pre-Heating Step)

The films on the two substrates after the step of forming a film from a photo-alignment-film material were pre-heated at 70° C. for 150 seconds. The pre-heating was performed using a hot plate (trade name: EC-1200N, As One Corp.). The pre-heated films formed from the photo-alignment-film material had a thickness of about 100 nm.
(First Light Irradiation Step)

The pre-heated films on the two substrates were irradiated with polarized ultraviolet rays. The dose of the polarized ultraviolet rays was 5 mJ/cm$^2$ at a center wavelength of around 313 nm.
(First Main Heating Step)

The first-light-irradiated films on the two substrates were main-heated at 140° C. for 10 minutes. The main heating was performed using a hot plate (trade name: EC-1200N, As One Corp.).
(Second Light Irradiation Step)

The first-main-heated films on the two substrates were irradiated with ultraviolet rays. The dose of the ultraviolet rays was 1 J/cm$^2$ at a center wavelength of around 313 nm.
(Second Main Heating Step)

The second-light-irradiated films on the two substrates were main-heated at 180° C. for five minutes. The main heating was performed using a hot plate (trade name: EC-1200N, As One Corp.).

Thereafter, the two substrates after the second main heating step were assembled in the same manner as in the method for manufacturing a liquid crystal display device of Example 1, and thereby an FFS-mode liquid crystal display panel was obtained. This display panel was appropriately provided with components such as a polarizing plate and a backlight. Thereby, a liquid crystal display device according to Example 9-1 was obtained. The liquid crystal material used was one containing liquid crystal molecules having positive anisotropy of dielectric constant, and the thickness of the liquid crystal layer was 3.5 μm.

Example 9-2

Example 9-2 was performed in the same manner as in Example 9-1 except that the second light irradiation step was not performed. A method for manufacturing a liquid crystal display device according to Example 9-2 was the same as that of Example 9-1 except for the absence of the second light irradiation step. Thus, the description of the same respects is omitted here.

Evaluation Results: Example 9-1 and Example 9-2

A voltage of 5 V was continually applied at 60° C. to the liquid crystal display devices manufactured by the methods of manufacturing a liquid crystal display device of Example 9-1 and Example 9-2. After 500 hours, the voltage holding ratios in both of the examples were found to be 97% or higher. Table 5 shows the evaluation results of the display quality of the liquid crystal display devices manufactured by the methods of manufacturing a liquid crystal display device of Example 9-1 and Example 9-2.

(Evaluation Method of Display Quality)

The display quality was evaluated on a four-level scale in the same manner as in Examples 2-1 to 2-6. Level 1: the contrast was not lower than 1200. Level 2: the contrast was not lower than 1000 but lower than 1200. Level 3: the contrast was not lower than 500 but lower than 1000. Level 4: the contrast was lower than 500 or an alignment defect was visually observed. Those of Level 1 to 3 were evaluated as suitable for products, whereas those of Level 4 were evaluated as not suitable for products.

TABLE 5

|  | Evaluation results |
| --- | --- |
| Example 9-1 | Level 1 |
| Example 9-2 | Level 3 |

(Evaluation Results of Display Quality)

The results of evaluating the display quality in the respective examples are described below.

Example 9-1

The result of evaluating the display quality was Level 1 and was very good. This is presumably because sufficient progress of the self-assembly was followed by sufficient progress of the evaporation of the residual solvent, so that the orientational order of the polymer improved by the self-assembly was sufficiently immobilized. Thus, the method for manufacturing a liquid crystal display device of Example 9-1 can sufficiently improve the display quality.

Example 9-2

The result of evaluating the display quality was Level 3 and was good. This is presumably because sufficient progress of the self-assembly was followed by sufficient progress of the evaporation of the residual solvent, so that the orientational order of the polymer improved by the self-assembly was sufficiently immobilized. Thus, the method for manufacturing a liquid crystal display device of Example 9-2 can sufficiently improve the display quality.

The following will describe the reason why the display quality of Example 9-1 was better than that of Example 9-2. In Example 9-1, presumably, the second light irradiation step allows the dimerization of the cinnamate group to further proceed, and then the second main heating step sufficiently immobilizes the orientational order of the polymer. In contrast, Example 9-2 includes no second light irradiation step. Thus, the orientational order of the polymer is not presumably relatively improved in comparison with Example 9-1. Thereby, the display quality of Example 9-1 was better than that of Example 9-2.

Example 10-1

Example 10-1 was performed in the same manner as in Example 1 except that one of the two substrates was a thin film transistor array substrate including a thin film transistor element and the other was a color filter substrate. The semiconductor layer of the thin film transistor element was an oxide semiconductor (In—Ga—Zn—O) composed of indium (In), gallium (Ga), zinc (Zn), and oxygen (O). A method for manufacturing a liquid crystal display device according to Example 10-1 was the same as that of Example 1 except for the structure of the liquid crystal display device. Thus, the description of the same respects is omitted here.

(Structure of Liquid Crystal Display Device)

A liquid crystal display device has an FFS-mode electrode structure, and the pre-tilt angle is 0°. The semiconductor layer of the thin film transistor element was an oxide semiconductor (In—Ga—Zn—O). The display size is 10 inches (2048×1560 pixels).

Example 10-2

Example 10-2 was performed in the same manner as in Example 1 except that one of the two substrates was a thin film transistor array substrate including a thin film transistor element and the other was a color filter substrate. The semiconductor layer of the thin film transistor element was amorphous silicon. A method for manufacturing a liquid crystal display device according to Example 10-2 was the same as that of Example 1 except for the structure of the liquid crystal display device. Thus, the description of the same respects is omitted here.

(Structure of Liquid Crystal Display Device)

A liquid crystal display device has an FFS-mode electrode structure, and the pre-tilt angle is 0°. The semiconductor layer of the thin film transistor element was amorphous silicon. The display size is 10 inches (2048×1560 pixels).

Evaluation Results: Example 10-1 and Example 10-2

For the liquid crystal display devices manufactured by the methods for manufacturing a liquid crystal display device of Example 10-1 and Example 10-2, the image sticking characteristics and the voltage holding ratio characteristics were evaluated in terms of display quality. For the image sticking characteristics, a check pattern of white (grayscale level: 255) and black (grayscale level: 0) was displayed for one hour, and then the image sticking level was evaluated in the state of displaying a color with a grayscale level of 32 on the whole screen. For the voltage holding ratio characteristics, a white-and-black check pattern was displayed for 500 hours, and then the level of stains or unevenness was evaluated in the state of displaying a color with a grayscale level of 32 on the whole screen.

(Evaluation Method of Display Quality)

A liquid crystal display device was turned on in a darkroom, and the display quality was visually observed with the naked eye and through a neutral density (ND) filter on a four-level scale. Level A: no alignment unevenness was visually observed with the naked eye. Level B: no alignment unevenness was visually observed through a 50% ND filter. Level C: no alignment unevenness was visually observed through a 20% ND filter. Level D: alignment unevenness was visually observed through a 20% ND filter. Those of Level A, B, or C were evaluated as suitable for products, whereas those of Level D were evaluated as not suitable for products.

(Evaluation Results of Image Sticking Characteristics)

The image sticking characteristics of Example 10-1 and Example 10-2 were both Level B.

(Evaluation Results of Voltage Holding Ratio Characteristics)

The voltage holding ratio characteristics of Example 10-1 and Example 10-2 were both Level B.

However, the aperture ratio of the liquid crystal display panel of Example 10-1 was 50% and was higher than that of Example 10-2 (40%). As a result, the contrast and the transmittance of Example 10-1 were each 20% better than those of Example 10-2. Thus, the method for manufacturing a liquid crystal display device of Example 10-1 can more improve the display quality than the method for manufacturing a liquid crystal display device of Example 10-2.

The following will describe the reason why the aperture ratio of Example 10-1 was higher than that of Example 10-2. An oxide semiconductor characteristically has a higher mobility than amorphous silicon. Thus, a thin film transistor element containing an oxide semiconductor occupies a smaller area in one pixel than a thin film transistor element containing amorphous silicon. Thus, the method for manufacturing a liquid crystal display device of Example 10-1 can more improve the aperture ratio than the method for manufacturing a liquid crystal display device of Example 10-2, more improving the display quality.

Example 11-1

In Example 11-1, a solvent contained in the photo-alignment-film material was a mixture of N-methyl-pyrrolidone (good solvent) and butyl cellosolve (poor solvent) at a weight ratio of 50:50, which is the same as Example 1. A method for manufacturing a liquid crystal display device according to Example 11-1 was the same as that of Example 1. Thus, the description of the same respects is omitted here.

Example 11-2

Example 11-2 was performed in the same manner as in Example 11-1 except that a solvent contained in the photo-alignment-film material was a mixture of N-ethyl-pyrrolidone (good solvent) and butyl cellosolve (poor solvent) at a weight ratio of 50:50. A method for manufacturing a liquid crystal display device according to Example 11-2 was the same as that of Example 11-1 except for the photo-alignment-film material. Thus, the description of the same respects is omitted here.

(Photo-Alignment-Film Material)

A mixture of two polymers at a weight ratio of 50:50 was used as a solid matter. One of the two polymers is a polymer including a methacrylic backbone and a photo-reactive cinnamate group in a side chain, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of N-ethyl-pyrrolidone and butyl cellosolve at a weight ratio of 50:50. The solid concentration was 4% by weight.

Example 11-3

Example 11-3 was performed in the same manner as in Example 11-1 except that a solvent contained in the photo-alignment-film material was a mixture of γ-butyrolactone (good solvent) and butyl cellosolve (poor solvent) at a weight ratio of 50:50. A method for manufacturing a liquid crystal display device according to Example 11-3 was the same as that of Example 11-1 except for the photo-alignment-film material. Thus, the description of the same respects is omitted here.

(Photo-Alignment-Film Material)

A mixture of two polymers at a weight ratio of 50:50 was used as a solid matter. One of the two polymers is a polymer including a methacrylic backbone and a photo-reactive cinnamate group in a side chain, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of γ-butyrolactone and butyl cellosolve at a weight ratio of 50:50. The solid concentration was 4% by weight.

Example 11-4

Example 11-4 was performed in the same manner as in Example 11-1 except that a solvent contained in the photo-alignment-film material was a mixture of acetone (good solvent) and butyl cellosolve (poor solvent) at a weight ratio of 50:50. A method for manufacturing a liquid crystal display device according to Example 11-4 was the same as that of Example 11-1 except for the photo-alignment-film material. Thus, the description of the same respects is omitted here.
(Photo-Alignment-Film Material)

A mixture of two polymers at a weight ratio of 50:50 was used as a solid matter. One of the two polymers is a polymer including a methacrylic backbone and a photo-reactive cinnamate group in a side chain, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of acetone and butyl cellosolve at a weight ratio of 50:50. The solid concentration was 4% by weight.

Example 11-5

Example 11-5 was performed in the same manner as in Example 11-1 except that a solvent contained in the photo-alignment-film material was a mixture of chloroform (good solvent) and butyl cellosolve (poor solvent) at a weight ratio of 50:50. A method for manufacturing a liquid crystal display device according to Example 11-5 was the same as that of Example 11-1 except for the photo-alignment-film material. Thus, the description of the same respects is omitted here.
(Photo-Alignment-Film Material)

A mixture of two polymers at a weight ratio of 50:50 was used as a solid matter. One of the two polymers is a polymer including a methacrylic backbone and a photo-reactive cinnamate group in a side chain, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of chloroform and butyl cellosolve at a weight ratio of 50:50. The solid concentration was 4% by weight.

Example 11-6

Example 11-6 was performed in the same manner as in Example 11-1 except that a solvent contained in the photo-alignment-film material was a mixture of cyclopentanone (good solvent) and butyl cellosolve (poor solvent) at a weight ratio of 50:50. A method for manufacturing a liquid crystal display device according to Example 11-6 was the same as that of Example 11-1 except for the photo-alignment-film material. Thus, the description of the same respects is omitted here.
(Photo-Alignment-Film Material)

A mixture of two polymers at a weight ratio of 50:50 was used as a solid matter. One of the two polymers is a polymer including a methacrylic backbone and a photo-reactive cinnamate group in a side chain, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of cyclopentanone and butyl cellosolve at a weight ratio of 50:50. The solid concentration was 4% by weight.

Example 11-7

Example 11-7 was performed in the same manner as in Example 11-1 except that a solvent contained in the photo-alignment-film material was a mixture of N-methyl-pyrrolidone (good solvent) and diethylene glycol diethyl ether (poor solvent) at a weight ratio of 50:50. A method for manufacturing a liquid crystal display device according to Example 11-7 was the same as that of Example 11-1 except for the photo-alignment-film material. Thus, the description of the same respects is omitted here.
(Photo-Alignment-Film Material)

A mixture of two polymers at a weight ratio of 50:50 was used as a solid matter. One of the two polymers is a polymer including a methacrylic backbone and a photo-reactive cinnamate group in a side chain, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of N-methyl-pyrrolidone and diethylene glycol diethyl ether at a weight ratio of 50:50. The solid concentration was 4% by weight.

Example 11-8

Example 11-8 was performed in the same manner as in Example 11-1 except that a solvent contained in the photo-alignment-film material was a mixture of N-methyl-pyrrolidone (good solvent) and diisobutyl ketone (poor solvent) at a weight ratio of 50:50. A method for manufacturing a liquid crystal display device according to Example 11-8 was the same as that of Example 11-1 except for the photo-alignment-film material. Thus, the description of the same respects is omitted here.
(Photo-Alignment-Film Material)

A mixture of two polymers at a weight ratio of 50:50 was used as a solid matter. One of the two polymers is a polymer including a methacrylic backbone and a photo-reactive cinnamate group in a side chain, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of N-methyl-pyrrolidone and diisobutyl ketone at a weight ratio of 50:50. The solid concentration was 4% by weight.

Example 11-9

Example 11-9 was performed in the same manner as in Example 11-1 except that a solvent contained in the photo-alignment-film material was a mixture of N-methyl-pyrrolidone (good solvent) and propylene glycol monobutyl ether (poor solvent) at a weight ratio of 50:50. A method for manufacturing a liquid crystal display device according to Example 11-9 was the same as that of Example 11-1 except for the photo-alignment-film material. Thus, the description of the same respects is omitted here.
(Photo-Alignment-Film Material)

A mixture of two polymers at a weight ratio of 50:50 was used as a solid matter. One of the two polymers is a polymer including a methacrylic backbone and a photo-reactive cinnamate group in a side chain, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of N-methyl-pyrrolidone and propylene glycol monobutyl ether at a weight ratio of 50:50. The solid concentration was 4% by weight.

Example 11-10

Example 11-10 was performed in the same manner as in Example 11-1 except that a solvent contained in the photo-alignment-film material was a mixture of N-methyl-pyrrolidone (good solvent) and diacetone alcohol (poor solvent) at a weight ratio of 50:50. A method for manufacturing a liquid crystal display device according to Example 11-10 was the same as that of Example 11-1 except for the photo-alignment-film material. Thus, the description of the same respects is omitted here.
(Photo-Alignment-Film Material)

A mixture of two polymers at a weight ratio of 50:50 was used as a solid matter. One of the two polymers is a polymer including a methacrylic backbone and a photo-reactive cinnamate group in a side chain, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of N-methyl-pyrrolidone and diacetone alcohol at a weight ratio of 50:50. The solid concentration was 4% by weight.

Example 11-11

Example 11-11 was performed in the same manner as in Example 11-1 except that a solvent contained in the photo-alignment-film material was a mixture of N-methyl-pyrrolidone (good solvent) and hexane (poor solvent) at a weight ratio of 50:50. A method for manufacturing a liquid crystal display device according to Example 11-11 was the same as that of Example 11-1 except for the photo-alignment-film material. Thus, the description of the same respects is omitted here.
(Photo-Alignment-Film Material)

A mixture of two polymers at a weight ratio of 50:50 was used as a solid matter. One of the two polymers is a polymer including a methacrylic backbone and a photo-reactive cinnamate group in a side chain, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of N-methyl-pyrrolidone and hexane at a weight ratio of 50:50. The solid concentration was 4% by weight.

Example 11-12

Example 11-12 was performed in the same manner as in Example 11-1 except that a solvent contained in the photo-alignment-film material was a mixture of N-methyl-pyrrolidone (good solvent) and methanol (poor solvent) at a weight ratio of 50:50. A method for manufacturing a liquid crystal display device according to Example 11-12 was the same as that of Example 11-1 except for the photo-alignment-film material. Thus, the description of the same respects is omitted here.
(Photo-Alignment-Film Material)

A mixture of two polymers at a weight ratio of 50:50 was used as a solid matter. One of the two polymers is a polymer including a methacrylic backbone and a photo-reactive cinnamate group in a side chain, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of N-methyl-pyrrolidone and methanol at a weight ratio of 50:50. The solid concentration was 4% by weight.

Example 11-13

Example 11-13 was performed in the same manner as in Example 11-1 except that a solvent contained in the photo-alignment-film material was a mixture of N-methyl-pyrrolidone (good solvent) and isopropyl alcohol (poor solvent) at a weight ratio of 50:50. A method for manufacturing a liquid crystal display device according to Example 11-13 was the same as that of Example 11-1 except for the photo-alignment-film material. Thus, the description of the same respects is omitted here.
(Photo-Alignment-Film Material)

A mixture of two polymers at a weight ratio of 50:50 was used as a solid matter. One of the two polymers is a polymer including a methacrylic backbone and a photo-reactive cinnamate group in a side chain, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of N-methyl-pyrrolidone and isopropyl alcohol at a weight ratio of 50:50. The solid concentration was 4% by weight.

Example 11-14

Example 11-14 was performed in the same manner as in Example 11-1 except that a solvent contained in the photo-alignment-film material was a mixture of acetone (good solvent) and hexane (poor solvent) at a weight ratio of 50:50. A method for manufacturing a liquid crystal display device according to Example 11-14 was the same as that of Example 11-1 except for the photo-alignment-film material. Thus, the description of the same respects is omitted here.
(Photo-Alignment-Film Material)

A mixture of two polymers at a weight ratio of 50:50 was used as a solid matter. One of the two polymers is a polymer including a methacrylic backbone and a photo-reactive cinnamate group in a side chain, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of acetone and hexane at a weight ratio of 50:50. The solid concentration was 4% by weight.

Example 11-15

Example 11-15 was performed in the same manner as in Example 11-1 except that a solvent contained in the photo-alignment-film material was a mixture of chloroform (good solvent) and methanol (poor solvent) at a weight ratio of 50:50. A method for manufacturing a liquid crystal display device according to Example 11-15 was the same as that of Example 11-1 except for the photo-alignment-film material. Thus, the description of the same respects is omitted here.

(Photo-Alignment-Film Material)

A mixture of two polymers at a weight ratio of 50:50 was used as a solid matter. One of the two polymers is a polymer including a methacrylic backbone and a photo-reactive cinnamate group in a side chain, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of chloroform and methanol at a weight ratio of 50:50. The solid concentration was 4% by weight.

Example 11-16

Example 11-16 was performed in the same manner as in Example 11-1 except that a solvent contained in the photo-alignment-film material was a mixture of cyclopentanone (good solvent) and isopropyl alcohol (poor solvent) at a weight ratio of 50:50. A method for manufacturing a liquid crystal display device according to Example 11-16 was the same as that of Example 11-1 except for the photo-alignment-film material. Thus, the description of the same respects is omitted here.

(Photo-Alignment-Film Material)

A mixture of two polymers at a weight ratio of 50:50 was used as a solid matter. One of the two polymers is a polymer including a methacrylic backbone and a photo-reactive cinnamate group in a side chain, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of cyclopentanone and isopropyl alcohol at a weight ratio of 50:50. The solid concentration was 4% by weight.

Evaluation Results: Examples 11-1 to 11-16

For the liquid crystal display devices manufactured by the methods for manufacturing a liquid crystal display device of Examples 11-1 to 11-16, the solvent components (good solvent and poor solvent) and the results of evaluating the display quality are shown in Table 6.

(Evaluation Method of Display Quality)

A liquid crystal display device was turned on in a darkroom, and the display quality was visually observed with the naked eye and through a neutral density (ND) filter on a four-level scale. Level A: no alignment unevenness was visually observed with the naked eye. Level B: no alignment unevenness was visually observed through a 50% ND filter. Level C: no alignment unevenness was visually observed through a 20% ND filter. Level D: alignment unevenness was visually observed through a 20% ND filter. Those of Level A, B, or C were evaluated as suitable for products, whereas those of Level D were evaluated as not suitable for products.

TABLE 6

| | Solvent | | Evaluation |
|---|---|---|---|
| | Good solvent | Poor solvent | results |
| Example 11-1 | N-methyl-pyrrolidone | Butyl cellosolve | Level A |
| Example 11-2 | N-ethyl-pyrrolidone | Butyl cellosolve | Level A |
| Example 11-3 | γ-Butyrolactone | Butyl cellosolve | Level A |
| Example 11-4 | Acetone | Butyl cellosolve | Level B |
| Example 11-5 | Chloroform | Butyl cellosolve | Level B |
| Example 11-6 | Cyclopentanone | Butyl cellosolve | Level B |
| Example 11-7 | N-methyl-pyrrolidone | Diethylene glycol diethyl ether | Level A |
| Example 11-8 | N-methyl-pyrrolidone | Diisobutyl ketone | Level A |
| Example 11-9 | N-methyl-pyrrolidone | Propylene glycol monobutyl ether | Level A |
| Example 11-10 | N-methyl-pyrrolidone | Diacetone alcohol | Level A |
| Example 11-11 | N-methyl-pyrrolidone | Hexane | Level B |
| Example 11-12 | N-methyl-pyrrolidone | Methanol | Level B |
| Example 11-13 | N-methyl-pyrrolidone | Isopropyl alcohol | Level B |
| Example 11-14 | Acetone | Hexane | Level C |
| Example 11-15 | Chloroform | Methanol | Level C |
| Example 11-16 | Cyclopentanone | Isopropyl alcohol | Level C |

(Evaluation Results of Display Quality)

The results of evaluating the display quality in the respective examples are described below.

Example 11-1

The result of evaluating the display quality was Level A and was very good. This is presumably because an uneven film thickness was sufficiently prevented in the state after the pre-heating step. Thus, the method for manufacturing a liquid crystal display device of Example 11-1 can sufficiently improve the display quality.

Example 11-2

The result of evaluating the display quality was Level A and was very good. This is presumably because an uneven film thickness was sufficiently prevented in the state after the pre-heating step. Thus, the method for manufacturing a liquid crystal display device of Example 11-2 can sufficiently improve the display quality.

Example 11-3

The result of evaluating the display quality was Level A and was very good. This is presumably because an uneven film thickness was sufficiently prevented in the state after the pre-heating step. Thus, the method for manufacturing a liquid crystal display device of Example 11-3 can sufficiently improve the display quality.

Example 11-4

The result of evaluating the display quality was Level B and was good. This is presumably because an uneven film thickness was sufficiently prevented in the state after the pre-heating step. Thus, the method for manufacturing a liquid crystal display device of Example 11-4 can sufficiently improve the display quality.

Example 11-5

The result of evaluating the display quality was Level B and was good. This is presumably because an uneven film thickness was sufficiently prevented in the state after the pre-heating step. Thus, the method for manufacturing a liquid crystal display device of Example 11-5 can sufficiently improve the display quality.

Example 11-6

The result of evaluating the display quality was Level B and was good. This is presumably because an uneven film thickness was sufficiently prevented in the state after the pre-heating step. Thus, the method for manufacturing a liquid crystal display device of Example 11-6 can sufficiently improve the display quality.

Example 11-7

The result of evaluating the display quality was Level A and was very good. This is presumably because an uneven film thickness was sufficiently prevented in the state after the pre-heating step. Thus, the method for manufacturing a liquid crystal display device of Example 11-7 can sufficiently improve the display quality.

Example 11-8

The result of evaluating the display quality was Level A and was very good. This is presumably because an uneven film thickness was sufficiently prevented in the state after the pre-heating step. Thus, the method for manufacturing a liquid crystal display device of Example 11-8 can sufficiently improve the display quality.

Example 11-9

The result of evaluating the display quality was Level A and was very good. This is presumably because an uneven film thickness was sufficiently prevented in the state after the pre-heating step. Thus, the method for manufacturing a liquid crystal display device of Example 11-9 can sufficiently improve the display quality.

Example 11-10

The result of evaluating the display quality was Level A and was very good. This is presumably because an uneven film thickness was sufficiently prevented in the state after the pre-heating step. Thus, the method for manufacturing a liquid crystal display device of Example 11-10 can sufficiently improve the display quality.

Example 11-11

The result of evaluating the display quality was Level B and was good. This is presumably because an uneven film thickness was sufficiently prevented in the state after the pre-heating step. Thus, the method for manufacturing a liquid crystal display device of Example 11-11 can sufficiently improve the display quality.

Example 11-12

The result of evaluating the display quality was Level B and was good. This is presumably because an uneven film thickness was sufficiently prevented in the state after the pre-heating step. Thus, the method for manufacturing a liquid crystal display device of Example 11-12 can sufficiently improve the display quality.

Example 11-13

The result of evaluating the display quality was Level B and was good. This is presumably because an uneven film thickness was sufficiently prevented in the state after the pre-heating step. Thus, the method for manufacturing a liquid crystal display device of Example 11-13 can sufficiently improve the display quality.

Example 11-14

The result of evaluating the display quality was Level C. This is presumably because an uneven film thickness was sufficiently prevented in the state after the pre-heating step. Thus, the method for manufacturing a liquid crystal display device of Example 11-14 can sufficiently improve the display quality.

Example 11-15

The result of evaluating the display quality was Level C. This is presumably because an uneven film thickness was sufficiently prevented in the state after the pre-heating step. Thus, the method for manufacturing a liquid crystal display device of Example 11-15 can sufficiently improve the display quality.

Example 11-16

The result of evaluating the display quality was Level C. This is presumably because an uneven film thickness was sufficiently prevented in the state after the pre-heating step. Thus, the method for manufacturing a liquid crystal display device of Example 11-16 can sufficiently improve the display quality.

The following will describe the reason why the display quality of Examples 11-1 to 11-3 and Examples 11-7 to 11-10 are much better than that of the other examples. In order to more improve the display quality, a solvent contained in the photo-alignment-film material is preferably a mixture of a good solvent with high solubility and a poor solvent with low surface tension and high easiness of application. If at least one compound selected from the group consisting of acetone, chloroform, and cyclopentanone is used as a good solvent and at least one compound selected from the group consisting of hexane, methanol, and isopropyl alcohol is used as a poor solvent, the photo-alignment-film material is relatively poorly spread on a substrate in forming a film. As a result, presumably, an uneven film thickness more markedly occurs in the state after the pre-heating step and alignment unevenness is visually observed. Thus, the display quality of Examples 11-1 to 11-3 and Examples 11-7 to 11-10 was much better than that of the other examples.

Accordingly, a solvent contained in the photo-alignment-film material is found to be preferably a mixture of a good solvent and a poor solvent. Further, it is found to be preferable that the good solvent is at least one compound selected from the group consisting of N-methyl-pyrrolidone, N-ethyl-pyrrolidone, and γ-butyrolactone and that the poor solvent is at least one compound selected from the group consisting of butyl cellosolve, diethylene glycol diethyl ether, diisobutyl ketone and structural isomers thereof, propylene glycol monobutyl ether, and diacetone alcohol.

Comparative Example 5

In Comparative Example 5, a degradable photo-alignment film and a liquid crystal material containing liquid crystal molecules having positive anisotropy of dielectric constant were used and the light irradiation step was performed after the main heating step. The following describes a method for manufacturing a liquid crystal display device according to Comparative Example 5.

(Structure of Liquid Crystal Display Device)

A liquid crystal display device has an FFS-mode electrode structure, and the pre-tilt angle is 0°.

(Photo-Alignment-Film Material)

A polyamide acid polymer including a cyclobutane backbone was used as a solid matter. A solvent used was a mixture of N-methyl-pyrrolidone and butyl cellosolve at a weight ratio of 50:50. The solid concentration was 4% by weight.

(Step of Forming Film from Photo-Alignment-Film Material)

A film was formed on each of two substrates from the photo-alignment-film material by spin-coating.

(Pre-Heating Step)

The films on the two substrates after the step of forming a film from a photo-alignment-film material were pre-heated at 70° C. for 150 seconds. The pre-heating was performed using a hot plate (trade name: EC-1200N, As One Corp.). The pre-heated films formed from the photo-alignment-film material had a thickness of about 100 nm.

(First Main Heating Step)

The pre-heated films on the two substrates were main-heated at 230° C. for 60 minutes. The main heating was performed using a hot plate (trade name: EC-1200N, As One Corp.).

(Light Irradiation Step)

The first-main-heated films on the two substrates were irradiated with polarized ultraviolet rays. The dose of the polarized ultraviolet ray was 1 J/cm$^2$ within a wavelength range of 220 to 260 nm.

(Second Main Heating Step)

The light-irradiated films on the two substrates were main-heated at 230° C. for 30 minutes. The main heating was performed using a hot plate (trade name: EC-1200N, As One Corp.).

Thereafter, the two substrates after the second main heating step were assembled in the same manner as in the method for manufacturing a liquid crystal display device of Example 1, and thereby an FFS-mode liquid crystal display panel was obtained. This display panel was appropriately provided with components such as a polarizing plate and a backlight. Thereby, a liquid crystal display device according to Comparative Example 5 was obtained. The liquid crystal material used was one containing liquid crystal molecules having positive anisotropy of dielectric constant, and the thickness of the liquid crystal layer was 3.5 µm.

Comparative Example 6

Comparative Example 6 was performed in the same manner as in Comparative Example 5 except that a liquid crystal material containing liquid crystal molecules having negative anisotropy of dielectric constant was used. The method for manufacturing a liquid crystal display device according to Comparative Example 6 was the same as that of Comparative Example 5 except that the anisotropy of dielectric constant of the liquid crystal molecules is different. Thus, the description of the same respects is omitted here.

Evaluation Results: Comparative Example 5 and Comparative Example 6

For the liquid crystal display devices manufactured by the methods for manufacturing a liquid crystal display device of Comparative Example 5 and Comparative Example 6, the contrast, image sticking characteristics, and voltage holding ratio were evaluated. Those satisfying a contrast of not lower than 500, image sticking characteristics (image sticking rate) of within 5%, and a voltage holding ratio of not lower than 97% were evaluated as suitable for products. The contrast was determined in the same manner as in Examples 2-1 to 2-6, the image sticking characteristics were evaluated in the same manner as in Example 4, and the voltage holding ratio was determined in the same manner as in Example 1.

(Measurement Results of Contrast)

The contrasts in Comparative Example 5 and Comparative Example 6 were both about 1200 and equivalent to each other, which were at a level suitable for products.

(Evaluation Results of Image Sticking Characteristics)

The image sticking rates in Comparative Example 5 and Comparative Example 6 were both about 3% and equivalent to each other, which were at a level suitable for products.

(Measurement Results of Voltage Holding Ratio)

A voltage of 5 V was continually applied at 60° C. After 500 hours, the voltage holding ratios in Comparative Example 5 and Comparative Example 6 were both 98% or higher and equivalent to each other, which were at a level suitable for products.

However, a one-week heating/cooling cycle test showed that minute bright points more markedly occurred on the display in Comparative Example 6 than in Comparative Example 5. The conditions of the heating/cooling cycle test were as follows. Temperature range: −10° C. or higher and 70° C. or lower; Time period of one cycle: 1 hour. Further, the workpiece was left at room temperature for one month. Then, minute bright points more markedly occurred on the display in Comparative Example 6 than in Comparative Example 5.

In Comparative Example 5 and Comparative Example 6, presumably, polarized UV irradiation caused generation of low-molecular-weight degradation products, and the degradation products were eluted and aggregated in the liquid crystal to serve as bright points. Bright points more markedly occurred in the case of using a liquid crystal material containing liquid crystal molecules having negative anisotropy of dielectric constant than in the case of using a liquid crystal material containing liquid crystal molecules having positive anisotropy of dielectric constant. This is presumably because a larger amount of degradation products thereof is eluted into the liquid crystal. Thus, improving the display quality is found to be more difficult in the case of using a liquid crystal material containing liquid crystal molecules having negative anisotropy of dielectric constant. Still, as mentioned above (e.g., Example 4), the method for manufacturing a liquid crystal display device according to one aspect of the present invention can sufficiently improve the display quality even with a liquid crystal material containing liquid crystal molecules having negative anisotropy of dielectric constant.

Comparative Example 7

In Comparative Example 7, the same photo-alignment-film material as in Example 1 was used and the light irradiation step was performed after the main heating step. The following describes a method for manufacturing a liquid crystal display device according to Comparative Example 7.

(Structure of Liquid Crystal Display Device)

A liquid crystal display device has an FFS-mode electrode structure, and the pre-tilt angle is 0°.

(Photo-Alignment-Film Material)

A mixture of two polymers at a weight ratio of 50:50 was used as a solid matter. One of the two polymers is a polymer including a methacrylic backbone and a photo-reactive cinnamate group in a side chain, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of N-methyl-pyrrolidone and butyl cellosolve at a weight ratio of 50:50. The solid concentration was 4% by weight.

(Step of Forming Film from Photo-Alignment-Film Material)

A film was formed on each of two substrates from the photo-alignment-film material by spin-coating.

(Pre-Heating Step)

The films on the two substrates after the step of forming a film from a photo-alignment-film material were pre-heated at 70° C. for 150 seconds. The pre-heating was performed using a hot plate (trade name: EC-1200N, As One Corp.). The pre-heated films formed from the photo-alignment-film material had a thickness of about 100 nm.

(First Main Heating Step)

The pre-heated films on the two substrates were main-heated at 110° C. for 20 minutes. The main heating was performed using a hot plate (trade name: EC-1200N, As One Corp.).

(First Light Irradiation Step)

The first-main-heated films on the two substrates were irradiated with ultraviolet rays. The dose of the ultraviolet rays was 200 mJ/cm$^2$ at a center wavelength of around 313 nm.

(Second Main Heating Step)

The first-light-irradiated films on the two substrates were main-heated at 200° C. for 30 minutes. The main heating was performed using a hot plate (trade name: EC-1200N, As One Corp.).

(Second Light Irradiation Step)

The second-main-heated films on the two substrates were irradiated with polarized ultraviolet rays. The dose of the polarized ultraviolet rays was 5 mJ/cm$^2$ within a wavelength range of 280 to 330 nm.

Thereafter, the two substrates after the second light irradiation step were assembled in the same manner as in the method for manufacturing a liquid crystal display device of Example 1, and thereby an FFS-mode liquid crystal display panel was obtained. This display panel was appropriately provided with components such as a polarizing plate and a backlight. Thereby, a liquid crystal display device according to Comparative Example 7 was obtained. The liquid crystal material used was one containing liquid crystal molecules having positive anisotropy of dielectric constant, and the thickness of the liquid crystal layer was 3.5 μm.

Comparative Example 8

In Comparative Example 8, the same photo-alignment-film material as in Example 5 was used and the light irradiation step was performed after the main heating step. The following describes a method for manufacturing a liquid crystal display device according to Comparative Example 8.

(Structure of Liquid Crystal Display Device)

A liquid crystal display device has an FFS-mode electrode structure, and the pre-tilt angle is 0°.

(Photo-Alignment-Film Material)

A mixture of two polymers at a weight ratio of 50:50 was used as a solid matter. One of the two polymers is a polymer including a photo-reactive azobenzene structure, and the other is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of N-methyl-pyrrolidone and butyl cellosolve at a weight ratio of 50:50. The solid concentration was 4% by weight.

(Step of Forming Film from Photo-Alignment-Film Material)

A film was formed on each of two substrates from the photo-alignment-film material by spin-coating.

(Pre-Heating Step)

The films on the two substrates after the step of forming a film from a photo-alignment-film material were pre-heated at 60° C. for 150 seconds. The pre-heating was performed using a hot plate (trade name: EC-1200N, As One Corp.). The pre-heated films formed from the photo-alignment-film material had a thickness of about 100 nm.

(First Main Heating Step)

The pre-heated films on the two substrates were main-heated at 110° C. for 20 minutes. The main heating was performed using a hot plate (trade name: EC-1200N, As One Corp.).

(Second Main Heating Step)

The first-main-heated films on the two substrates were main-heated at 200° C. for 30 minutes. The main heating was performed using a hot plate (trade name: EC-1200N, As One Corp.).

(Light Irradiation Step)

The second-main-heated films on the two substrates were irradiated with polarized ultraviolet rays. The dose of the polarized ultraviolet rays was 3 J/cm$^2$ at a center wavelength of around 365 nm.

Thereafter, the two substrates after the light irradiation step were assembled in the same manner as in the method for manufacturing a liquid crystal display device of Example 1, and thereby an FFS-mode liquid crystal display panel was obtained. This display panel was appropriately provided with components such as a polarizing plate and a backlight. Thereby, a liquid crystal display device according to Comparative Example 8 was obtained. The liquid crystal material used was one containing liquid crystal molecules having negative anisotropy of dielectric constant, and the thickness of the liquid crystal layer was 3.5 μm.

Evaluation Results: Comparative Example 7 and Comparative Example 8

The liquid crystal display devices manufactured by the methods for manufacturing a liquid crystal display device of Comparative Example 7 and Comparative Example 8 were evaluated. As a result, the contrasts thereof were both not higher than 50 and were very low. This is presumably because the light irradiation step was performed after the thermochemical reaction of the polymer was allowed to proceed in the main heating step, and thus the orientational order of the polymer was not improved. Thus, in order to sufficiently improve the orientational order of the polymer, it is found to be important to allow the self-assembly to proceed, as mentioned above, and to give anisotropy formed by the light irradiation step as a trigger before the main heating step.

Example 12

In Example 12, the main heating was performed twice at different temperatures in the step (4). The following describes a method for manufacturing a liquid crystal display device according to Example 12.
(Structure of Liquid Crystal Display Device)
A liquid crystal display device has an FFS-mode electrode structure, and the pre-tilt angle is 0°.
(Photo-Alignment-Film Material)
A mixture of two polymers at a weight ratio of 50:50 was used as a solid matter. One of the two polymers is a polyamic acid obtained by reacting an acid anhydride (TCA) represented by the chemical formula (1) shown below and a diamine including a photo-reactive phenyl ester group. The other of the two polymers is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of N-methyl-pyrrolidone and butyl cellosolve at a weight ratio of 50:50. The solid concentration was 4% by weight. The phenyl ester group is a photo-functional group capable of causing photo-Fries rearrangement.

[Chem. 1]

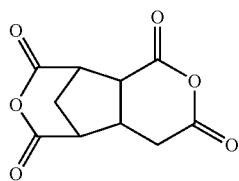

(1)

(Step of Forming Film from Photo-Alignment-Film Material)
A film was formed on each of two substrates from the photo-alignment-film material by spin-coating.
(Pre-Heating Step)
The films on the two substrates after the step of forming a film from a photo-alignment-film material were pre-heated at 60° C. for 150 seconds. The pre-heating was performed using a hot plate (trade name: EC-1200N, As One Corp.). The pre-heated films formed from the photo-alignment-film material had a thickness of about 100 nm.
(Light Irradiation Step)
The pre-heated films on the two substrates were irradiated with polarized ultraviolet rays. The dose of the polarized ultraviolet rays was 1 J/cm$^2$ at a center wavelength of around 254 nm.
(First Main Heating Step)
The light-irradiated films on the two substrates were main-heated at 120° C. for 20 minutes. The main heating was performed using a hot plate (trade name: EC-1200N, As One Corp.).
(Second Main Heating Step)
The first-main-heated films on the two substrates were main-heated at 220° C. for 30 minutes. The main heating was performed using a hot plate (trade name: EC-1200N, As One Corp.).
Thereafter, the two substrates after the second main heating step were assembled in the same manner as the method for manufacturing a liquid crystal display device of Example 1, and thereby an FFS-mode liquid crystal display panel was obtained. This display panel was appropriately provided with components such as a polarizing plate and a backlight. Thereby, a liquid crystal display device according to Example 12 was obtained. The liquid crystal material used was one containing liquid crystal molecules having negative anisotropy of dielectric constant, and the thickness of the liquid crystal layer was 3.5 µm.

Comparative Example 9

Comparative Example 9 was performed in the same manner as in Example 12 except that a photo-alignment-film material containing no polyamic acid which is free from a photo-functional group and a side chain was used. A method for manufacturing a liquid crystal display device according to Comparative Example 9 was the same as that of Example 12 except for the photo-alignment-film material. Thus, the description of the same respects is omitted here.
(Photo-Alignment-Film Material)
A polyamic acid obtained by reacting an acid anhydride (TCA) represented by the above chemical formula (1) and a diamine including a photo-reactive phenyl ester group was used as a solid matter. A solvent used was a mixture of N-methyl-pyrrolidone and butyl cellosolve at a weight ratio of 50:50. The solid concentration was 4% by weight.

Evaluation Results: Example 12 and Comparative Example 9

For the liquid crystal display device manufactured by the method for manufacturing a liquid crystal display device of Example 12, the contrast and the image sticking characteristics were evaluated. The cases satisfying a contrast of 500 or higher and image sticking characteristics (image sticking rate) of within 5% were evaluated as suitable for products. The contrast was determined in the same manner as in Examples 2-1 to 2-6, and the image sticking characteristics were evaluated in the same manner as in Example 4.
(Measurement Results of Contrast)
The contrast in Example 12 was 1200, which was at a level suitable for products.
(Evaluation Results of Image Sticking Characteristics)
The image sticking rate in Example 12 was 3%, which was at a level suitable for products.
For the liquid crystal display devices manufactured by the methods for manufacturing a liquid crystal display device of Example 12 and Comparative Example 9, the voltage holding ratio was determined in the same manner as in Example 1.
(Measurement Results of Voltage Holding Ratio)
A voltage of 5 V was continually applied at 60° C. After 500 hours, the voltage holding ratio in Example 12 was found to be 97% or higher, which was higher than that in Comparative Example 9 (lower than 95%). A drop in the voltage holding ratio may cause display unevenness on a liquid crystal display device. Thus, the method for manufacturing a liquid crystal display device of Example 12 can sufficiently improve the voltage holding ratio, thereby sufficiently improving the display quality.

Example 13

In Example 13, the main heating was performed twice at different temperatures in the step (4). The following describes a method for manufacturing a liquid crystal display device according to Example 13.

(Structure of Liquid Crystal Display Device)

A liquid crystal display device has an FFS-mode electrode structure, and the pre-tilt angle is 0°.

(Photo-Alignment-Film Material)

A mixture of two polymers at a weight ratio of 50:50 was used as a solid matter. One of the two polymers is a polyamic acid obtained by reacting an acid anhydride (TCA) represented by the above chemical formula (1) and a diamine including photo-reactive phenyl ester and cinnamate groups. The other of the two polymers is a polyamic acid which is obtained by reacting 1,2,3,4-cyclobutanetetracarboxylic dianhydride (CBDA) and a diamine including a biphenyl structure and which is free from a photo-functional group and a side chain. A solvent used was a mixture of N-methyl-pyrrolidone and butyl cellosolve at a weight ratio of 50:50. The solid concentration was 4% by weight. This photo-alignment-film material is one containing a photo-functional group capable of causing photodimerization, photoisomerization, and photo-Fries rearrangement.

(Step of Forming Film from Photo-Alignment-Film Material)

A film was formed on each of two substrates from the photo-alignment-film material by spin-coating.

(Pre-Heating Step)

The films on the two substrates after the step of forming a film from a photo-alignment-film material were pre-heated at 60° C. for 150 seconds. The pre-heating was performed using a hot plate (trade name: EC-1200N, As One Corp.). The pre-heated films formed from the photo-alignment-film material had a thickness of about 100 nm.

(Light Irradiation Step)

The pre-heated films on the two substrates were irradiated with polarized ultraviolet rays. The dose of the polarized ultraviolet rays was 500 mJ/cm$^2$ at a center wavelength of around 313 nm and 100 mJ/cm$^2$ at a center wavelength of around 254 nm.

(First Main Heating Step)

The light-irradiated films on the two substrates were main-heated at 120° C. for 20 minutes. The main heating was performed using a hot plate (trade name: EC-1200N, As One Corp.).

(Second Main Heating Step)

The first-main-heated films on the two substrates were main-heated at 220° C. for 30 minutes. The main heating was performed using a hot plate (trade name: EC-1200N, As One Corp.).

Thereafter, the two substrates after the second main heating step were assembled in the same manner as the method for manufacturing a liquid crystal display device of Example 1, and thereby an FFS-mode liquid crystal display panel was obtained. This display panel was appropriately provided with components such as a polarizing plate and a backlight. Thereby, a liquid crystal display device according to Example 13 was obtained. The liquid crystal material used was one containing liquid crystal molecules having negative anisotropy of dielectric constant, and the thickness of the liquid crystal layer was 3.5 μm.

Comparative Example 10

Comparative Example 10 was performed in the same manner as in Example 13 except that a photo-alignment-film material containing no polyamic acid which is free from a photo-functional group and a side chain was used. A method for manufacturing a liquid crystal display device according to Comparative Example 10 was the same as that of Example 13 except for the photo-alignment-film material. Thus, the description of the same respects is omitted here.

(Photo-Alignment-Film Material)

A polyamic acid obtained by reacting an acid anhydride (TCA) represented by the above chemical formula (1) and a diamine including photo-reactive phenyl ester and cinnamate groups was used as a solid matter. A solvent used was a mixture of N-methyl-pyrrolidone and butyl cellosolve at a weight ratio of 50:50. The solid concentration was 4% by weight.

Evaluation Results: Example 13 and Comparative Example 10

For the liquid crystal display device manufactured by the method for manufacturing a liquid crystal display device of Example 13, the contrast and the image sticking characteristics were evaluated. The cases satisfying a contrast of 500 or higher and image sticking characteristics (image sticking rate) of within 5% were evaluated as suitable for products. The contrast was determined in the same manner as in Examples 2-1 to 2-6, and the image sticking characteristics were evaluated in the same manner as in Example 4.

(Measurement Results of Contrast)

The contrast in Example 13 was 1200, which was at a level suitable for products.

(Evaluation Results of Image Sticking Characteristics)

The image sticking rate in Example 13 was 3%, which was at a level suitable for products.

For the liquid crystal display devices manufactured by the methods for manufacturing a liquid crystal display device of Example 13 and Comparative Example 10, the voltage holding ratio was determined in the same manner as in Example 1.

(Measurement Results of Voltage Holding Ratio)

A voltage of 5 V was continually applied at 60° C. After 500 hours, the voltage holding ratio in Example 13 was found to be 97% or higher, which was higher than that in Comparative Example 10 (lower than 95%). A drop in the voltage holding ratio may cause display unevenness on a liquid crystal display device. Thus, the method for manufacturing a liquid crystal display device of Example 13 can sufficiently improve the voltage holding ratio, thereby sufficiently improving the display quality.

The above examples are the cases of a method for manufacturing an FFS-mode liquid crystal display device. Still, a method for manufacturing an IPS-mode liquid crystal display device can obviously show the effects of one aspect of the present invention.

Other Preferable Examples

Even in the case of using a degradable photo-alignment film as in Comparative Example 2, 4, or the like, the dose of the polarized ultraviolet rays may be greatly decreased and the aforementioned occurrence of minute bright points and deterioration in electrical characteristics may be prevented by performing the light irradiation step before the main heating step to allow the self-assembly to proceed in the same manner as in the other aforementioned examples.

ADDITIONAL REMARKS

The following will describe examples of preferred embodiments of the method for manufacturing a liquid crystal display device according to one aspect of the present invention. The following examples may be employed in appropriate combination as long as the combination is not beyond the spirit of the present invention.

The main heating in the step (4) may be performed at a temperature of 90° C. or higher. Thereby, the molecular motion of the polymer accompanying the main heating can more easily occur and the orientational order of the polymer by the self-assembly can be more improved. If the main-heating temperature is lower than 90° C., the molecular motion of the polymer accompanying the main heating may not be active. The phrase "perform the main-heating at a temperature of 90° C. or higher" herein means that the main-heating is performed so as to include a temperature-constant period at a temperature of 90° C. or higher, for example. The temperature-constant period at 90° C. or higher may be, for example, a period of heating where the temperature is maintained within a range of ±5° C. for one minute or longer.

In order to more improve the contrast, the main heating temperature in the step (4) is more preferably 140° C. or higher. Thereby, the molecular motion of the polymer accompanying the main heating can be more activated and the orientational order of the polymer by the self-assembly can be more improved. If the main heating temperature is lower than 140° C., the molecular motion of the polymer accompanying the main heating may not be activated and the orientational order of the polymer by the self-assembly may not be sufficiently improved. If the main heating temperature exceeds 250° C., the color filter layer may be faded and the display quality of the liquid crystal display device may be degraded. Thus, the main heating temperature in the step (4) is still more preferably 140° C. or higher and 250° C. or lower.

The pre-heating in the step (2) may be performed at a temperature of 90° C. or lower, and preferably performed at 70° C. or lower. Thereby, the molecular motion of the polymer accompanying the following main heating can be more activated and the orientational order of the polymer by the self-assembly can be more improved. If the pre-heating temperature exceeds 90° C., a smaller amount of the solvent may remain. Thus, possibly, the molecular motion of the polymer accompanying the main heating is not activated and the orientational order of the polymer by the self-assembly is not sufficiently improved. The phrase "perform the pre-heating at a temperature of 90° C. or lower" herein means that the pre-heating is performed so as to include a temperature-constant period at a temperature of 90° C. or lower, for example. The temperature-constant period at 90° C. or lower may be, for example, a period of heating where the temperature is maintained within a range of ±5° C. for 30 seconds or longer.

The pre-heating temperature in the step (2) is still more preferably 40° C. or higher and 70° C. or lower. Thereby, the molecular motion of the polymer accompanying the following main heating can be more activated and the orientational order of the polymer by the self-assembly can be more improved. If the pre-heating temperature is lower than 40° C., the evaporation of the solvent takes a long time and an uneven film thickness accompanying the convection of the solution markedly occurs. As a result, alignment unevenness may be visually observed when the liquid crystal display device is turned on. If the pre-heating temperature exceeds 70° C., a smaller amount of the solvent remains. Thus, the molecular motion of the polymer accompanying the main heating may not be activated and the orientational order of the polymer by the self-assembly may not be sufficiently improved.

In order to efficiently evaporate the solvent, the pre-heating temperature in the step (2) is particularly preferably 50° C. or higher and 70° C. or lower.

The liquid crystal display device may align liquid crystal molecules having negative anisotropy of dielectric constant by the photo-alignment film. Thereby, the transmittance and the viewing angle characteristics can be more improved.

The main heating in the step (4) may include an operation performed so as to include multiple temperature-constant periods at different temperatures from a lower temperature to a higher temperature. Thereby, the main heating can be performed stepwise at multiple different temperatures and the display quality can be sufficiently improved. The temperature-constant period herein may be, for example, a period of heating where the temperature is maintained within a range of ±5° C. for one minute or longer.

The main heating in the step (4) may include two main heating operations at different temperatures, the first main heating operation may be performed at a temperature of 90° C. or higher and 140° C. or lower, and the second main heating operation may be performed at a temperature of 180° C. or higher. Thereby, the molecular motion of the polymer can be more active and the orientational order of the polymer by the self-assembly can be sufficiently improved. If the first main heating temperature exceeds 140° C., the thermochemical reaction of the polymer and the evaporation of the residual solvent may be markedly initiated, possibly inhibiting the self-assembly. In order to allow the self-assembly to markedly proceed, the first main heating temperature is more preferably not lower than 110° C. but lower than 120° C.

If the second main heating temperature is lower than 180° C., the amount of the residual solvent may not be sufficiently reduced, possibly degrading the display quality. In order to more improve the display quality, the second main heating temperature is preferably 180° C. or higher and 250° C. or lower. If the second main heating temperature exceeds 250° C., the color filter layer may be faded and the display quality of the liquid crystal display device may be degraded. In order to allow the thermochemical reaction of the polymer to sufficiently proceed, the second main heating temperature is more preferably 200° C. or higher and 250° C. or lower.

The main heating in the step (4) may be performed using multiple heaters set to different temperatures. Thereby, an operation of main-heating the polarized-light-irradiated film can be suitably performed so as to include multiple temperature-constant periods at different temperatures from lower temperature to higher temperature. In comparison with the cases of using a single heater, the production efficiency can be more improved.

The main heating in the step (4) may be performed using a single heater and the temperature of the heater is successively changed to a different temperature. Thereby, an operation of main-heating the polarized-light-irradiated film can be suitably performed so as to include multiple temperature-constant periods at different temperatures from lower temperature to higher temperature. In comparison with the cases of using multiple heaters, the footprint of the heater can be reduced and the degree of freedom of the device layout can be improved.

The main heating in the step (4) may be performed by transferring the substrate in a heater that includes a region having a temperature gradient. Thereby, an operation of main-heating the polarized-light-irradiated film can be suitably performed so as to include multiple temperature-constant periods at different temperatures from lower temperature to higher temperature.

The photo-functional group may be at least one functional group selected from the group consisting of a cinnamate group, a chalcone group, a coumarin group, a stilbene group, a phenyl ester group, and an azobenzene group.

The polymer including the photo-functional group may include a backbone that has at least one structure selected from the group consisting of polyamic acids, polyimides, acrylic structures, methacrylic structures, maleimide, and polysiloxanes.

Part of a polyamic acid may be thermochemically reacted (thermally imidized). Thereby, the electrical characteristics, such as specific resistance and dielectric constant, of the photo-alignment film can be adjusted. A backbone of a combination of an acrylic or methacrylic structure and maleimide, i.e., a copolymer structure, makes it possible to introduce another structure having no photo-reactivity into a photo-alignment-film material. Introduction of a photo-functional group into a diamine which forms a polyamic acid or a polyimide may be considered. Such introduction may appropriately be achieved by a copolymer structure including another diamine having no photo-reactivity. Use of the above copolymer structure is an effective way to adjust the sensitivity of the photo-reactivity, the electrical characteristics, and the alignment characteristics in a balanced manner.

A monomer including multiple functional groups such as epoxy, carboxylic acid, amine, acrylate, methacrylate, or the like may be added to the photo-alignment-film material in advance. Thereby, the long-term reliability can be improved. This monomer serves as a crosslinker for the polymer contained in the photo-alignment-film material, and forms a network structure in the photo-alignment film. Thereby, impurities contained in the photo-alignment film or the substrates (e.g., color filter substrate) are prevented from being eluted into the liquid crystal, so that a drop in the voltage holding ratio can be sufficiently suppressed during long-term use of the liquid crystal display device.

The photo-functional group may be capable of causing at least photodimerization, the step (4) may include two main heating operations at different temperatures and, between the first and second main heating operations, a step (4a) of irradiating the film after the first main heating with light. Thereby, the display quality can be suitably improved when a photo-alignment-film material containing a polymer including a photodimerizable photo-functional group is used.

In order to improve the ability to self-assemble, a material of the polymer contained in the photo-alignment-film material preferably includes in a main chain or a side chain a structure represented by any of the following formulas (2) to (4):

[Chem. 2]

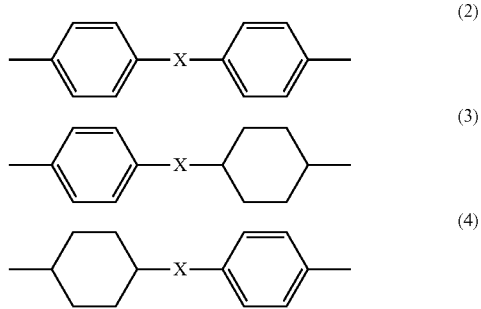

(2)

(3)

(4)

wherein X represents a direct bond, O, COO, OCO, CO, or C≡C. Any hydrogen atom in the benzene rings and cyclohexanes of the formulas may individually be replaced by a fluorine atom (F) or a chlorine atom (Cl). The benzene rings and cyclohexanes of the formulas each may be a heterocycle in which any carbon atom (C) is replaced by an oxygen atom (O), a nitrogen atom (N), or a sulfur atom (S).

The structures represented by the formulas (2) to (4) are each similar to the core structure of a liquid crystalline molecule. Thus, a molecular interaction similar to liquid crystallinity works to activate the self-assembly. Especially, when a phenyl ester structure is included, this structure can be superimposed on a portion where photo-Fries rearrangement occurs. Further, another molecular design may be possible in which the above structure is superimposed on a photo-sensitive portion such as a cinnamate group, a chalcone group, a coumarin group, or a stilbene group.

In order to improve the ability to self-assemble, a material of the polymer contained in the photo-alignment-film material preferably includes one or both of a carboxyl group and an amide group in a main chain or a side chain. In this case, the hydrogen bond between C=O and O—H or between N—H and C=O activates the self-assembly. In particular, the ability to self-assemble can be improved by introducing one or both of a carboxyl group and an amide group into a main chain or a side chain in addition to the portion where a polyamic acid or a polyimide is to be formed.

The polymer including the polyamic acid backbone and free from the photo-functional group also preferably includes the aforementioned structure that activates the self-assembly.

The solvent may be a mixture of at least one compound selected from the group consisting of N-methyl-pyrrolidone, N-ethyl-pyrrolidone, and γ-butyrolactone and at least one compound selected from the group consisting of butyl cellosolve, diethylene glycol diethyl ether, diisobutyl ketone and structural isomers thereof, propylene glycol monobutyl ether, and diacetone alcohol.

The substrate may include a thin film transistor array substrate including a thin film transistor element, and the thin film transistor element may include a semiconductor layer containing an oxide semiconductor.

The oxide semiconductor characteristically has a higher mobility and a smaller variation in characteristics than amorphous silicon. Thus, a thin film transistor element containing an oxide semiconductor can be more rapidly driven, have a higher driving frequency, and occupy a smaller area in one pixel than a thin film transistor element containing amorphous silicon. As a result, such a thin film transistor element is suitable for driving next-generation display devices with a higher definition. Further, oxide semiconductor films can be formed by a more simple process than polycrystalline silicon films. Thus, they can advantageously be applied to devices requiring a large area. As a result, if the substrate includes a thin film transistor array substrate including a thin film transistor element and the thin film transistor element includes a semiconductor layer containing an oxide semiconductor, a liquid crystal display device showing the effects of one aspect of the present invention and allowing for rapid driving can be manufactured.

The oxide semiconductor may be a compound (In—Ga—Zn—O) composed of indium (In), gallium (Ga), zinc (Zn), and oxygen (O), a compound (In-Tin-Zn—O) composed of indium (In), tin (Tin), zinc (Zn), and oxygen (O), or a compound (In—Al—Zn—O) composed of indium (In), aluminum (Al), zinc (Zn), and oxygen (O).

If the oxide semiconductor unfortunately contains water, the oxygen content therein may decrease and the characteristics thereof may be changed. Thus, the photo-alignment-film material preferably has low moisture absorbency. A polymer including a polyimide backbone may be suitably used as a polymer having relatively high moisture absorbency. A polymer including an acrylic, methacrylic, maleimide, or polysiloxane backbone may be suitably used as a photo-reactive polymer.

The invention claimed is:

1. A method for manufacturing a liquid crystal display device including a photo-alignment film, the method for manufacturing a liquid crystal display device successively comprising:
    a step (1) of forming on a substrate a film from a photo-alignment-film material that contains a solvent, a polymer including a photo-functional group that is capable of causing at least one chemical reaction selected from the group consisting of photodimerization, photoisomerization, and photo-Fries rearrangement, and a polymer including a polyamic acid backbone and free from the photo-functional group;
    a step (2) of pre-heating the film to evaporate the solvent;
    a step (3) of irradiating the pre-heated film with polarized light; and
    a step (4) of main-heating the polarized-light-irradiated film, wherein
    the main-heating in the step (4) includes an operation performed that includes multiple temperature-constant periods at different temperatures from a lower temperature to a higher temperature, and
    the liquid crystal display device being of an in-plane switching mode or a fringe field switching mode in each of which a pre-tilt angle is substantially 0°.

2. The method for manufacturing a liquid crystal display device according to claim 1, wherein the main heating in the step (4) is performed at a temperature of 90° C. or higher.

3. The method for manufacturing a liquid crystal display device according to claim 1, wherein the pre-heating in the step (2) is performed at a temperature of 90° C. or lower.

4. The method for manufacturing a liquid crystal display device according to claim 1, wherein
    the main heating in the step (4) includes two main heating operations at different temperatures,
    the first main heating operation is performed at a temperature of 90° C. or higher and 140° C. or lower, and
    the second main heating operation is performed at a temperature of 180° C. or higher.

5. The method for manufacturing a liquid crystal display device according to claim 1, wherein the main heating in the step (4) is performed using multiple heaters set to different temperatures.

6. The method for manufacturing a liquid crystal display device according to claim 1, wherein the main heating in the step (4) is performed using a single heater and the temperature of the heater is successively changed to a different temperature.

7. The method for manufacturing a liquid crystal display device according to claim 1, wherein the main heating in the step (4) is performed by transferring the substrate in a heater that includes a region having a temperature gradient.

8. The method for manufacturing a liquid crystal display device according to claim 1, wherein the photo-functional group is at least one functional group selected from the group consisting of a cinnamate group, a chalcone group, a coumarin group, a stilbene group, a phenyl ester group, and an azobenzene group.

9. The method for manufacturing a liquid crystal display device according to claim 1, wherein the polymer including the photo-functional group includes a backbone that has at least one structure selected from the group consisting of polyamic acids, polyimides, acrylic structures, methacrylic structures, maleimide, and polysiloxanes.

10. The method for manufacturing a liquid crystal display device according to claim 1, wherein
    the photo-functional group is capable of causing at least photodimerization,
    the step (4) includes two main heating operations at different temperatures and,
    between the first and second main heating operations, a step (4a) of irradiating the film after the first main heating with light.

11. A method for manufacturing a liquid crystal display device including a photo-alignment film, the method for manufacturing a liquid crystal display device successively comprising:
    a step (1) of forming on a substrate a film from a photo-alignment-film material that contains a solvent, a polymer including a photo-functional group that is capable of causing at least one chemical reaction selected from the group consisting of photodimerization, photoisomerization, and photo-Fries rearrangement, and a polymer including a polyamic acid backbone and free from the photo-functional group;
    a step (2) of pre-heating the film to evaporate the solvent;
    a step (3) of irradiating the film with polarized light; and
    a step (4) of main heating the film, wherein
    the main heating in the step (4) is performed using multiple heaters set to different temperatures, and
    the liquid crystal display device is of an in-plane switching mode or a fringe field switching mode in each of which a pre-tilt angle is substantially 0°.

12. The method for manufacturing a liquid crystal display device according to claim 11, wherein the main heating in the step (4) is performed at a temperature of 90° C. or higher.

13. The method for manufacturing a liquid crystal display device according to claim 11, wherein the pre-heating in the step (2) is performed at a temperature of 90° C. or lower.

14. The method for manufacturing a liquid crystal display device according to claim 11, wherein the main heating in the step (4) includes an operation performed to include multiple temperature-constant periods at different temperatures from a lower temperature to a higher temperature.

15. A method for manufacturing a liquid crystal display device including a photo-alignment film, the method for manufacturing a liquid crystal display device successively comprising:
    a step (1) of forming on a substrate a film from a photo-alignment-film material that contains a solvent, a polymer including a photo-functional group that is capable of causing at least one chemical reaction selected from the group consisting of photodimerization, photoisomerization, and photo-Fries rearrangement, and a polymer including a polyamic acid backbone and free from the photo-functional group;
    a step (2) of pre-heating the film to evaporate the solvent;
    a step (3) of irradiating the film with polarized light; and
    a step (4) of main-heating the film, wherein
    the photo-functional group is capable of causing at least photodimerization,
    the step (4) includes two main heating operations at different temperatures,
    between a first main heating operation of the step (4) and a second main heating operation of the step (4), the method further comprises a step (4a) of irradiating the film with light after the first main heating operation, and the liquid crystal display device is of an in-plane switching mode or a fringe field switching mode in each of which a pre-tilt angle is substantially 0°.

16. The method for manufacturing a liquid crystal display device according to claim 15, wherein the main heating in the step (4) is performed at a temperature of 90° C. or higher.

17. The method for manufacturing a liquid crystal display device according to claim 15, wherein the pre-heating in the step (2) is performed at a temperature of 90° C. or lower.

18. The method for manufacturing a liquid crystal display device according to claim 15, wherein the main heating in the step (4) includes an operation performed to include two temperature-constant periods at different temperatures from a lower temperature in the first main heating operation to a higher temperature in the second main heating operation.

19. The method for manufacturing a liquid crystal display device according to claim 18, wherein the first main heating operation is performed at a temperature of 90° C. or higher and 140° C. or lower, and the second main heating operation is performed at a temperature of 180° C. or higher.

* * * * *